United States Patent
Pittet et al.

(10) Patent No.: US 12,043,047 B2
(45) Date of Patent: Jul. 23, 2024

(54) PROCESS FOR PRODUCING DICHROIC SECURITY FEATURES FOR SECURING VALUE DOCUMENTS

(71) Applicant: SICPA HOLDING SA, Prilly (CH)

(72) Inventors: Hervé Pittet, Châtel-St-Denis (CH); Marlyse Demartin Maeder, La Sarraz (CH); Patrick Veya, Aclens (CH); Nikolay Grigorenko, Möhlin (CH); Andre Oswald, Rheinfelden (DE); Michelle Richert, Illzach (FR)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 17/921,038

(22) PCT Filed: Apr. 22, 2021

(86) PCT No.: PCT/EP2021/060570
§ 371 (c)(1),
(2) Date: Oct. 24, 2022

(87) PCT Pub. No.: WO2021/214244
PCT Pub. Date: Oct. 28, 2021

(65) Prior Publication Data
US 2023/0166551 A1  Jun. 1, 2023

(30) Foreign Application Priority Data

Apr. 23, 2020  (EP) .................... 20171031

(51) Int. Cl.
| B41M 3/14 | (2006.01) |
| B41M 7/00 | (2006.01) |
| C09D 11/03 | (2014.01) |
| C09D 11/101 | (2014.01) |
| C09D 11/106 | (2014.01) |
| C09D 11/50 | (2014.01) |

(52) U.S. Cl.
CPC .......... B41M 3/142 (2013.01); B41M 7/0081 (2013.01); B41M 7/009 (2013.01); C09D 11/03 (2013.01); C09D 11/101 (2013.01); C09D 11/106 (2013.01); C09D 11/50 (2013.01)

(58) Field of Classification Search
CPC ..... C09D 11/03; C09D 11/101; C09D 11/106; C09D 11/50; B41M 3/14
USPC ........ 283/67, 70, 72, 74, 75, 77, 91, 94, 98, 283/901
See application file for complete search history.

(56) References Cited

U.S. PATENT DOCUMENTS

| 8,141,908 | B2 | 3/2012 | Whiteman et al. |
| 8,573,651 | B2 | 11/2013 | Seki et al. |
| 9,272,564 | B2 | 3/2016 | Whiteman |
| 10,654,307 | B2 | 5/2020 | Garnier et al. |
| 2006/0023879 | A1 | 2/2006 | Hoshino et al. |
| 2012/0242075 | A1 | 9/2012 | Lochbihler |
| 2017/0081533 | A1 | 3/2017 | Brust et al. |
| 2019/0062020 | A1 | 2/2019 | Wessely |
| 2019/0390076 | A1 | 12/2019 | Isonaka et al. |
| 2021/0171786 | A1* | 6/2021 | Grigorenko .......... C09D 11/103 |

FOREIGN PATENT DOCUMENTS

| CN | 1283840 | 2/2001 |
| CN | 1681647 | 10/2005 |
| CN | 101223316 | 7/2008 |
| CN | 101795870 | 8/2010 |
| CN | 101896363 | 11/2010 |
| CN | 105636794 | 6/2016 |
| CN | 105916697 | 8/2016 |
| CN | 109070620 | 12/2018 |
| CN | 110088650 | 8/2019 |
| WO | 2006074969 | 7/2006 |
| WO | 2011064162 | 6/2011 |
| WO | 2013127715 | 9/2013 |
| WO | 2013139636 | 9/2013 |

(Continued)

OTHER PUBLICATIONS

China Patent Office Action in counterpart Chinese Application No. 202180030193.3 dated Jun. 29, 2023 (and English language translation of Office Action).
The Printing Ink Manual, R.H. Leach and R.J. Pierce, Springer Edition, 5th Edition, 2008, pp. 58-62.
Printing Technology, J. M. Adams and P.A. Dolin, Delmar Thomson Learning, 5th Edition, pp. 293-328.
Handbook of Print Media, H. Kipphan, Springer, pp. 409-422 and pp. 498-499.
Handbook of Print Media, Helmut Kipphan, Springer Edition, 2001, p. 48.

(Continued)

*Primary Examiner* — Justin V Lewis
(74) *Attorney, Agent, or Firm* — Muncy, Geissler, Olds & Lowe, P.C.

(57) ABSTRACT

The present invention provides a process for manufacturing a security feature for securing a value document, wherein said security feature exhibits a blue color upon viewing in transmitted light and a metallic yellow color upon viewing in Incident light. The manufacturing process comprises the following steps: a) printing a specific UV-Vis radiation curable ink on a transparent or partially transparent region of a substrate of a value document; b) heating the ink layer obtained at step a) at a temperature of about 55° C. to about 100° C. for at least one second so that the ink layer exhibits a metallic yellow color upon viewing in incident light; and c) UV-Vis curing the ink layer obtained at step b) to form the security feature. The manufacturing process according to the present invention enables the expedient production of security features exhibiting a blue color upon viewing in transmitted light and a metallic yellow color upon viewing in incident light and is particularly useful for industrial printing of value documents.

22 Claims, No Drawings

(56) References Cited

FOREIGN PATENT DOCUMENTS

| WO | 2013186167 | 12/2013 | |
|---|---|---|---|
| WO | 2014067715 | 5/2014 | |
| WO | 2014187750 | 11/2014 | |
| WO | 2015117765 | 8/2015 | |
| WO | 2017144911 | 8/2017 | |
| WO | 2018210597 | 11/2018 | |
| WO | WO-2018210597 A1 * | 11/2018 | ............ B22F 1/0018 |
| WO | 2020224982 | 11/2020 | |
| WO | 2020234211 | 11/2020 | |

OTHER PUBLICATIONS

Printing Technology, J. M. Adams and P.A. Dolin, Delmar Thomson Learning, 5th Edition, 2002, pp. 359-360.

"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

Industrial Photoinitiators, W. A. Green, CRC Press, 2010, Table 8.1 p .170.

International Search Report and Written Opinion issued with respect to application No. PCT/EP2021/060570.

* cited by examiner

PROCESS FOR PRODUCING DICHROIC SECURITY FEATURES FOR SECURING VALUE DOCUMENTS

FIELD OF THE INVENTION

The present invention relates to the technical field of processes for manufacturing dichroic security features exhibiting a first color upon viewing in transmitted light and a second color different from the first color upon viewing in incident light for securing value documents.

BACKGROUND OF THE INVENTION

With the constantly improving quality of color photocopies and printings and in an attempt to protect security documents such as banknotes, value documents or cards, transportation tickets or cards, tax banderols, and product labels that have no reproducible effects against counterfeiting, falsifying or illegal reproduction, it has been the conventional practice to incorporate various security means features in these documents.

Security features, e.g. for security documents, can generally be classified into "covert" security features and "overt" security features. The protection provided by covert security features relies on the concept that such features are difficult to detect, typically requiring specialized equipment and knowledge for detection, whereas 'overt' security features rely on the concept of being easily detectable with the unaided human senses, e.g. such features may be visible and/or detectable via the tactile senses while still being difficult to produce and/or to copy. However, the effectiveness of overt security features depends to a great extent on their easy recognition as a security feature, because most users, and particularly those having no prior knowledge of the security features of a document or item secured therewith, will only then actually perform a security check based on said security feature if they have actual knowledge of their existence and nature.

A special role in securing value documents is played by dichroic security features exhibiting a first color upon viewing in incident light and a second color different from the first color upon viewing in transmitted light. To provide a striking effect and draw the layperson's attention, the first color and the second color must have an attractive visual appearance, such as blue, metalic yellow, magenta, and green, and a significant color contrast (for e.g.: blue/metalic yellow, green/metallic yellow, violet/metallic yellow).

Such a dichroic security feature is disclosed by US patent application publication number US20120242075A1 describing a see-through security element comprising a thin-film element with multilayer structure and a carrier, which upon viewing in incident light appears gold-colored and upon viewing in transmitted light appears blue. The thin-film element comprises at least two semi-transparent mirror layers and at least one dielectric spacer layer arranged between the at least two mirror layers. The manufacturing process of the see-through security element is time-consuming since it involves thermal deposition, electron-beam vaporization, or sputtering of each of the at least three layers contained by the thin-film element on a carrier.

International patent application publication number WO2011064162A2 also describes a dichroic security, or decorative element comprising a substrate and on at least part of the said substrate surface, a coating comprising platelet shaped transition metal particles having a longest dimension of edge length of 15 nm to 1000 nm and a thickness of from 2 nm to 500 nm. Handcoater application of UV-curable inks containing silver platelets and either a solvent-based vehicle or a vehicle containing radically curable monomers and a free radical photoinitiator, wherein the weight ratio between the silver platelets and vehicle is 3:1.1, on a transparent substrate provides security, or decorative elements exhibiting a blue color in transmitted light and a gold/copper or gold/bronze color In reflected light. The high concentration of silver platelets in the inks used for obtaining the security, or decorative element described by WO2011064162A2 is detrimental to the mechanical resistance of the produced security, or decorative element, and additionally, renders the production process of said element expensive. Further, the mechanical resistance of the security, or decorative element, described by WO2011064162A2 is impaired by the use of UV radically curable inks or solvent-based inks, which as well known to the skilled person, provide cured coatings with limited mechanical resistance. As mechanical resistance is an essential property for security elements and the manufacturing process described by WO2011064162A2 is time-consuming and rather expensive, the technology described by said document is not suitable for the production of dichroic security features, and especially for the industrial production of dichroic security features on value documents.

Typically, industrial printing of value documents requires high printing speeds of about 8'000 sheets/hour, wherein from each sheet an important number of value documents is produced. For illustrative purpose. In the field of banknotes printing, up to 55 value documents, each containing one or more security features, may be produced from one sheet. To be suitable for implementation on a production line, it is essential that the production process of each printable security feature present on a value document complies with the high-speed requirements of industrial printing of value documents.

Thus, there remains a need for easy and cost-efficient processes for manufacturing at high speed (i.e. industrial speed) dichroic security features exhibiting a blue color upon viewing in transmitted light and a metallic yellow color upon viewing in incident light on value documents.

SUMMARY OF THE INVENTION

Accordingly, it is the object of the present invention to provide an easy and cost-efficient process for manufacturing at high speed (i.e. industrial speed) a security feature for securing a value document, wherein said security feature exhibits a blue color upon viewing in transmitted light and a metallic yellow color upon viewing in Incident light. This is achieved by the process claimed herein, wherein said process comprises the following steps:
  a) printing, preferably by screen printing, rotogravure, or flexography, a UV-Vis radiation curable ink on a transparent or partially transparent region of a substrate of a value document to provide an ink layer;
  b) heating the ink layer obtained at step a) at a temperature of about 55° C. to about 100° C. for at least one second so that the ink layer exhibits a metallic yellow color upon viewing in incident light; and
  c) UV-Vis curing the ink layer obtained at step b) to form the security feature;
wherein the UV-Vis radiation curable ink comprises:
  i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;

ii) from about 40 wt-% to about 75 wt-% of either a cycloaliphatic epoxide, or a mixture of a cycloaliphatic epoxide and one or more UV-Vis radiation curable compounds other than the cycloaliphatic epoxide;

iii) one or more cationic photoinitiators;

iv) a polyvinyl chloride copolymer containing at least about 69 wt-% of vinyl chloride;

v) a perfluoropolyether surfactant functionalized with one or more functional groups selected from the group consisting of: hydroxyl, acrylate, and methacrylate; and optionally vi) up to 25 wt-% of an organic solvent;

the weight percent of it), and vi) being based on the total weight of the UV-Vis radiation curable ink. The manufacturing process according to the present invention enables the production of security features exhibiting a blue color upon viewing in transmitted light and a metallic yellow color upon viewing in incident light on a value document in an expedient manner thereby, complying with the high-speed requirements of industrial printing of value documents. The attractive visual appearance and the contrast between the blue color exhibited in transmitted light and the metallic yellow color exhibited in incident light renders the security feature obtained via the process according to the present invention conspicuous, thereby drawing the layperson's attention to the security feature and aiding in finding and recognizing said security feature on the value document, and in authenticating the value document containing the security feature. Hence, the manufacturing process according to the present invention provides dichroic security features with attractive visual appearance and high value recognition.

Preferably, the concentration of silver nanoplatelets in the UV-Vis radiation curable ink is from about 5 wt-% to about 20 wt-%, preferably from about 7.5 wt-% to about 17.5 wt-%, more preferably from about 10 wt-% to about 15 wt-%, wherein the weight percents are based on the total weight of the UV-Vis radiation curable ink. The concentration of silver nanoplatelets in the UV-Vis radiation curable ink used in the process according to the present invention is significantly lower than the concentrations of silver platelets used in the inks known in the art. Hence, the manufacturing process claimed herein allows the production in a cost-efficient manner of dichroic security features with optical effects similar to the ones of the prior art, but significantly improved mechanical resistance properties.

In an embodiment according to the present invention, the UV-Vis radiation curable ink used in the manufacturing process claimed and described herein is a cationically curable ink comprising:

i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;

ii-1) from about 40 wt-% to about 75 wt-% of a cycloaliphatic epoxide;

iii) one or more cationic photoinitiators;

iv) a polyvinyl chloride copolymer containing at least about 69 wt-% of vinyl chloride;

v) a perfluoropolyether surfactant functionalized with one or more functional groups selected from the group consisting of: hydroxyl, acrylate, and methacrylate; and optionally vi) up to 25 wt-% of an organic solvent;

the weight percent of ii-1), and vi) being based on the total weight of the UV-Vis radiation curable ink.

In a further embodiment according to the present invention, the UV-Vis radiation curable ink used in the manufacturing process claimed and described herein is a cationically curable ink comprising:

i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;

ii-2) from about 40 wt-% to about 75 wt-% of a mixture of a cycloaliphatic epoxide and one or more cationically curable monomers other than the cycloaliphatic epoxide, wherein the ratio between the weight percent (wt-%) of the cycloaliphatic epoxide present in said ink and the weight percent (wt-%) of the one or more cationically curable monomers other than the cycloaliphatic epoxide present in said ink is higher than about 1.1:1;

iii) one or more cationic photoinitiators;

iv) a polyvinyl chloride copolymer containing at least about 69 wt-% of vinyl chloride;

v) a perfluoropolyether surfactant functionalized with one or more functional groups selected from the group consisting of: hydroxyl, acrylate, and methacrylate; and optionally vi) up to 25 wt-% of an organic solvent;

the weight percent of ii-2), and vi) being based on the total weight of the UV-Vis radiation curable ink.

The UV-Vis radiation curable ink used in the manufacturing process claimed and described herein may be a UV-Vis radiation hybrid curable ink comprising:

i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;

ii-3) from about 40 wt-% to about 75 wt-% of a mixture of a cycloaliphatic epoxide and one or more radically curable monomers and/or oligomers, wherein the ratio between the weight percent (wt-%) of the one or more radically curable monomers and/or oligomers present in said ink and the weight percent (wt-%) of the cycloaliphatic epoxide present in said ink is lower than about 1.6:1;

iii) one or more cationic photoinitiators;

iv) a polyvinyl chloride copolymer containing at least about 69 wt-% of vinyl chloride;

v) a perfluoropolyether surfactant functionalized with one or more functional groups selected from the group consisting of: hydroxyl, acrylate, and methacrylate;

ix) one or more free radical photoinitiators; and optionally vi) up to 25 wt-% of an organic solvent;

the weight percent of 11-3), and vi) being based on the total weight of the UV-Vis radiation curable ink.

In an alternative embodiment, the UV-Vis radiation curable ink used in the manufacturing process calmed and described herein may be a UV-Vis radiation hybrid curable ink comprising:
  i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;
  ii-4) from about 40 wt-% to about 75 wt-% of a mixture of a cycloaliphatic epoxide, one or more cationically curable monomers other than the cycloaliphatic epoxide, and one or more radically curable monomers and/or oligomers,
  wherein the ratio between the weight percent (wt-%) of the one or more radically curable monomers and/or oligomers present in said ink and the sum of the weight percent (wt-%) of the cycloaliphatic epoxide present in said ink and the weight percent (wt-%) of the one or more cationically curable monomers other than the cycloaliphatic epoxide present in said ink is lower than about 1.6:1, and
  wherein the ratio between the weight percent (wt-%) of the cycloaliphatic epoxide present in said ink and the weight percent (wt-%) of the one or more cationically curable monomers other than the cycloaliphatic epoxide present in said ink is higher than about 1.1:1;
  iii) one or more cationic photoinitiators;
  iv) a polyvinyl chloride copolymer containing at least about 69 wt-% of vinyl chloride;
  v) a perfluoropolyether surfactant functionalized with one or more functional groups selected from the group consisting of: hydroxyl, acrylate, and methacrylate;
  ix) one or more free radical photoinitiators; and optionally
  vi) up to 25 wt-% of an organic solvent; the weight percent of ii-4), and vi) being based on the total weight of the UV-Vis radiation curable ink.

Advantageously, the process claimed and described herein relying upon the use of the UV-Vis radiation cationically curable ink described herein, or of the UV-Vis radiation hybrid curable ink described herein provides security features with improved mechanical properties as compared to similar security features known in the art, which are obtained from UV radically curable inks or solvent-based inks, and particularly from UV radically curable inks or solvent-based inks containing high concentrations of silver nanoplatelets.

To provide the value document with soil resistance and/or to protect the security feature against physical and chemical attacks from the environment, the manufacturing process claimed herein preferably further comprises steps f) and g) conducted after step c):
  f) applying on the substrate, preferably by a printing process, a curable protective varnish to form a varnish layer;
  g) curing the varnish layer obtained at step f) so as to form a protective coating.

DETAILED DESCRIPTION

Definitions

The following definitions are to be used to interpret the meaning of the terms discussed in the description and recited in the claims.

As used herein, the article "a/an" indicates one as well as more than one and does not necessarily limit its referent noun to the singular.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5. i.e. the range from 95 to 105. Preferably, the range denoted by the term "about" denotes a range within ±3% of the value, more preferably ±1%. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

The term "comprising" as used herein is intended to be non-exclusive and open-ended. Thus, for instance a solution comprising a compound A may include other compounds besides A. However, the term "comprising" also covers, as a particular embodiment thereof, the more restrictive meanings of "consisting essentially of" and "consisting of", so that for instance "a solution comprising A, B, and optionally C" may also (essentially) consist of A, and B, or (essentially) consist of A, B. and C.

Where the present description refers to "preferred" embodiments/features, combinations of these "preferred" embodiments/features are also deemed to be disclosed as long as the specific combination of "preferred" embodiments/features is technically meaningful.

As used herein, the term "one or more" means one, two, three, four, etc.

The term "UV-Vis curable" and "UV-Vis curing" refers to radiation-curing by photo-polymerization, under the influence of an irradiation having wavelength components in the UV or in the UV and visible part of the electromagnetic spectrum (typically 100 nm to 800 nm, preferably between 150 and 600 nm and more preferably between 200 and 400 nm).

Surprisingly, it was found that a process for producing a security feature for securing a value document, wherein said security feature exhibits a blue color upon viewing in transmitted light and a metallic yellow color upon viewing in Incident light, said process comprising the following steps:
  a) printing, preferably by screen printing, rotogravure, or flexography, a UV-Vis radiation curable ink on a transparent or partially transparent region of a substrate of a value document to provide an ink layer;
  b) heating the ink layer obtained at step a) at a temperature of about 55° C. to about 100° C. for at least one second so that the ink layer exhibits a metallic yellow color upon viewing in Incident light; and
  c) UV-Vis curing the ink layer obtained at step b) to form the security feature;
wherein the UV-Vis radiation curable ink comprises:
  i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;

ii) from about 40 wt-% to about 75 wt-% of either a cycloaliphatic epoxide, or a mixture of a cycloaliphatic epoxide and one or more UV-Vis radiation curable compounds other than the cycloaliphatic epoxide;

iii) one or more cationic photoinitiators;

iv) a polyvinyl chloride copolymer containing at least about 69 wt-% of vinyl chloride;

v) a perfluoropolyether surfactant functionalized with one or more functional groups selected from the group consisting of: hydroxyl, acrylate, and methacrylate; and optionally vi) up to 25 wt-% of an organic solvent;

the weight percent of ii), and vi) being based on the total weight of the UV-Vis radiation curable ink, enables the expedient and cost-efficient production in a single printing step of dichroic security features with attractive visual appearance and high value recognition on value documents. The manufacturing process meets the high-speed requirements of industrial printing of value documents without affecting the optical properties exhibited by the dichroic security feature on the value document.

The security feature provided by the manufacturing process claimed herein exhibits a blue color upon viewing in transmitted light i.e. in transmission. For the purposes of the present invention, viewing in transmitted light means that the security feature is illuminated from one side, for example by holding said security feature against the daylight or in front of a light source, and viewed from the opposite side. Independently of the side from which the security feature is viewed in transmitted light, a blue color is observed. For the purposes of this invention, a security feature exhibiting a blue color refers to a security feature exhibiting a blue color characterized by a chroma value C* (corresponding to a measure of the color intensity or color saturation) higher than 20. An intense to very intense blue color is characterized by a chroma value C* higher than 30. The chroma value C* is calculated from a* and b* values according to the CIELAB (1976) color space, wherein $$C^* = \sqrt{(a^*)^2 + (b^*)^2}.$$

Said a* and b* values in transmitted light are measured using a Datacolor 650 spectrophotometer (parameters: integration sphere, diffuse illumination (pulse xenon D65) and 8° viewing, analyzer SP2000 with dual 256 diode array for wavelength range of 360-700 nm, transmission sampling aperture size of 22 mm).

The security feature provided by the manufacturing process claimed herein exhibits a metallic yellow color or gold color upon viewing in incident light I.e. In reflection. In the present patent application, the terms "metallic yellow color" and "gold color" are used interchangeably. For the purpose of the present invention, "viewing in incident light" means that the security feature is illuminated from one side and viewed from the same side. Independently of the side from which the security feature is viewed in incident light, a metallic yellow color is observed. For the purpose of the present invention, a security feature exhibiting a metallic yellow color or gold color refers to a security feature exhibiting a yellow color characterized by a chroma value C* (corresponding to a measure of the color intensity or color saturation) higher than 20 as calculated from a* and b* values according to the CIELAB (1976) color space, wherein $$C^* = \sqrt{(a^*)^2 + (b^*)^2}$$

and wherein said a* and b* values of the security feature were measured at 0° to the normal with an illumination angle of 22.5° using a goniometer (Goniospektrometer Codec WI-10 5&5 by Phyma GmbH Austria).

Step a) of the manufacturing process according to the present invention requires printing a UV-Vis radiation curable ink on a transparent or partially transparent region of a substrate of a value document to provide an ink layer. The inventive manufacturing process claimed herein enables access in a single printing step to a security feature displaying a metallic yellow color in incident light and a blue color, especially an intense to very intense blue color, in transmitted light. As used herein, the term "printing" refers to any printing process suitable for printing the UV-Vis radiation curable ink described herein on a substrate of a value document. In particularly, the term "printing" refers to a printing process selected from the group consisting of: screen printing, rotogravure, flexography, pad printing, inkjet printing, and spray printing. Preferably, the UV-Vis radiation curable ink is printed on a transparent or partially transparent region of the substrate of the value document by screen printing, rotogravure or flexography, more preferably by screen printing.

Screen printing (also referred in the art as silkscreen printing) is a printing technique that typically uses a screen made of woven mesh to support an ink-blocking stencil. The attached stencil forms open areas of mesh that transfer ink as a sharp-edged image onto a substrate. A squeegee is moved across the screen with ink-blocking stencil, forcing ink past the threads of the woven mesh in the open areas. A significant characteristic of screen printing is that a greater thickness of the ink can be applied to the substrate than with other printing techniques. Screen-printing is therefore also preferred when ink deposits with the thickness having a value between about 10 to 50 µm or greater are required which cannot (easily) be achieved with other printing techniques. Generally, a screen is made of a piece of porous, finely woven fabric called mesh stretched over a frame of e.g. aluminum or wood. Currently most meshes are made of man-made materials such as synthetic or steel threads. Preferred synthetic materials are nylon or polyester threads.

In addition to screens made on the basis of a woven mesh based on synthetic or metal threads, screens have been developed out of a solid metal sheet with a grid of holes. Such screens are prepared by a process comprising of electrolytically forming a metal screen by forming in a first electrolytic bath a screen skeleton upon a matrix provided with a separating agent, stripping the formed screen skeleton from the matrix and subjecting the screen skeleton to an electrolysis in a second electrolytic bath in order to deposit metal onto said skeleton.

There are three types of screen printing presses, namely flat-bed, cylinder and rotary screen printing presses. Flat-bed and cylinder screen printing presses are similar in that both use a flat screen and a three-step reciprocating process to perform the printing operation. The screen is first moved into position over the substrate, the squeegee is then pressed against the mesh and drawn over the image area, and then the screen is lifted away from the substrate to complete the process. With a flat-bed press the substrate to be printed is typically positioned on a horizontal print bed that is parallel to the screen. With a cylinder press the substrate is mounted on a cylinder. Flat-bed and cylinder screen printing processes are discontinuous processes, and consequently limited in speed which is generally at maximum 45 in/min in web or 3'000 sheets/hour in a sheet-fed process.

Conversely, rotary screen presses are designed for continuous, high speed printing. The screens used on rotary screen presses are for instance thin metal cylinders that are usually obtained using the electroforming method described hereabove or made of woven steel threads. The open-ended cylinders are capped at both ends and fitted into blocks at the side of the press. During printing, ink is pumped into one end of the cylinder so that a fresh supply is constantly maintained. The squeegee is fixed inside the rotating screen and squeegee pressure is maintained and adjusted to allow a good and constant print quality. The advantage of rotary screen presses is the speed which can reach easily 150 n/min in web or 10'000 sheets/hour in a sheet-fed process.

Screen printing is further described for example in *The Printing Ink Manual*, R. H. Leach and R. J. Pierce, Springer Edition, 5$^{th}$ Edition, pages 58-62, in *Printing Technology*, J. M. Adams and P. A. Dolin, Delmar Thomson Learning, 5$^{th}$ Edition, pages 293-328 and in *Handbook of Pint Media*, H. Kipphan, Springer, pages 409-422 and pages 498-499.

As known by those skilled in the art, the term rotogravure refers to a printing process which is described for example in *Handbook of Print Media*, Helmut Kipphan. Springer Edition, page 48. Rotogravure is a printing process wherein image elements are engraved into the surface of the cylinder. The non-image areas are at a constant original level. Prior to printing, the entire printing plate (non-printing and printing elements) is inked and flooded with ink. Ink is removed from the non-image by a wiper or a blade before printing, so that ink remains only in the cells. The image is transferred from the cells to the substrate by a pressure typically in the range of 2 to 4 bars and by the adhesive forces between the substrate and the ink. The term rotogravure does not encompass intaglio printing processes (also referred in the art as engraved steel die or copper plate printing processes) which rely for example on a different type of ink.

Flexography printing processes preferably use a unit with a chambered doctor blade, an anilox roller and plate cylinder. The anilox roller advantageously has small cells whose volume and/or density determines the ink or varnish application rate. The chambered doctor blade lies against the anilox roller, filing the cells and scraping off surplus ink or varnish at the same time. The anilox roller transfers the ink to the plate cylinder which finally transfers the ink to the substrate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the non-image areas, which lowers the plate surface in these non-image areas. After processing, the plate is dried and given a post-exposure dose of UV light to cure the whole plate. Preparation of plate cylinders for flexography is described in Printing Technology, J. M. Adams and P. A. Dolin, Delmar Thomson Learning, 5$^{th}$ Edition, pages 359-380.

As used herein, "a transparent or partially transparent region of a substrate of a value document" refers to a region of the substrate of the value document, wherein said region is characterized by an average transmittance in the visible range of at least 50%, preferably of at least 70%, more preferably of at least 90%. The transparent or partially transparent region of the substrate and the remaining region of the substrate may be made either of the same material, or of different materials. Elimination of one or more layers in a multilayer structure or application of a transparent or partially transparent material to an aperture in a substrate made of a material, which is different from the transparent or partially transparent material provides value documents substrates, wherein the transparent or partially transparent region of the substrate and the remaining region of the substrate are made of different materials.

Materials for value document substrates include without limitation, papers or other fibrous materials such as cellulose, paper-containing materials, plastics and polymers, composite materials, and mixtures or combinations thereof. Typical paper, paper-like or other fibrous materials are made from a variety of fibers including without limitation abaca, cotton, linen, wood pulp, and blends thereof. As well known to those skilled in the art, cotton and cotton/linen blends are preferred for banknotes, while wood pulp is commonly used in non-banknote security documents. Typical examples of plastics and polymers include polystyrene, polycarbonate, polyolefins, such as polyethylene (PE) and polypropylene (PP) including biaxially-oriented polypropylene (BOPP), polyamides (PA), polyesters such as poly(ethylene terephthalate) (PET), polyethylene terephthalate glycol-modified (PETG) including poly(ethylene glycol-co-1,4-cyclohexanedimethanol terephthalate), poly(1,4-butylene terephthalate) (PBT), and poly(ethylene 2,6-naphthoate) (PEN), and polyvinylchlorides (PVC). Typical examples of composite materials include without limitation multilayer structures or laminates of paper and at least one plastic or polymer material, such as those described hereabove. Suitable materials for the transparent or partially transparent region of the substrate include, but are not limited to polystyrene, polycarbonate, polyolefins, such as polyethylene (PE) and polypropylene (PP) Including biaxially-oriented polypropylene (BOPP), polyamides (PA), polyesters such as poly(ethylene terephthalate) (PET), polyethylene terephthalate glycol-modified (PETG) including poly(ethylene glycol-co-1,4-cyclohexanedimethanol terephthalate), poly(1,4-butylene terephthalate) (PBT), and poly(ethylene 2,6-naphthoate) (PEN), and polyvinylchlorides (PVC). The transparent or partially transparent region of the substrate of the value document may carry a primer layer on the top of which the UV-Vis radiation curable ink is printed. The primer layer may be obtained by UV-Vis curing a varnish containing all the ingredients of the UV-Vis radiation curable ink described herein, with the exception of the silver nanoplatelets.

At step b) of the inventive manufacturing process described herein, the ink layer obtained at step a) is heated at a temperature of about 55° C. to about 100° C. for at least one second so that the ink layer exhibits a metallic yellow color upon viewing in incident light. The heating step at a temperature of about 55° C. to about 100° C. for at least one second enables the alignment of the silver nanoplatelets contained in the ink layer at the interface between the ink layer and air and at the interface between the ink layer and the substrate, which results in the expedient formation of a thin layer of silver nanoplatelets at said interfaces and the development of the metallic yellow color observed in incident light. The use of the specific UV-Vis radiation curable ink described herein prevents the formation of silver agglomerates in the ink layer during the heating step. Formation of silver agglomerates is detrimental to the development of the blue color in transmitted light. Comparison of the comparative experiment C1 with experiment E1 according to the present invention proves that a minimum temperature of about 55° C. is required during the heating step to develop within one second a metallic yellow color in incident light and an intense blue color in transmitted light. Heating of the ink layer at a temperature of 50° C. for one second results in the development of a brown color of weak intensity in incident light, which is not eye-catching for the layperson, and therefore not suitable for a dichroic security feature for securing a value document. The development of the metallic yellow color within one second is achieved by heating the ink layer at a temperature of about 55° C. to about 100° C. (see for instance experiments E1-E6 according to the present invention). Hence, the manufacturing process according to the present invention relying upon the combination of the specific UV-Vis radiation curable ink described herein and the heating step at a temperature of about 55° C. to about 100° C. of the ink layer printed preferably by screen printing, rotogravure, or flexography, and more preferably by screen printing, provides access to ink layers displaying a metallic yellow color in incident light and a blue color, especially an intense to very intense blue color, in transmitted light within heating time periods as low as one second. The time period of at least one second required for the development of the metallic yellow color is compatible with the high-speed requirements of industrial printing of value documents.

Increase of the heating temperature from about 55° C. to about 100° C. and/or of the heating time provides security features exhibiting higher chroma values C* both in reflected light and in transmitted light as attested for example by experiments E1-E6 and E31-E39 according to the present invention. Preferably, at step b) the ink layer is heated at a temperature of about 80° C. to about 90° C. for at least one second, more preferably at a temperature of about 70° C. to about 90° C. for at least one second, and even more preferably at a temperature of about 80° C. for at least one second. To meet the high-speed requirements of the industrial printing of value documents, preferably the heating time is lower than or equal to about ten seconds, more preferably lower than or equal to about six seconds, such as five seconds, four seconds, three seconds, two seconds, and one second.

The heating step can be conducted by exposing for at least one second the substrate carrying the ink layer obtained at step a) at a temperature of about 55° C. to about 100° C. provided by a heating element, such as a hot air tunnel, an infrared drier, a heating plate, a heating cylinder, a microwave oven, a photonic curing tool, or a combination thereof. Preferred heating elements include hot air tunnels, infrared driers, and combinations thereof.

At step c) of the inventive manufacturing process claimed herein, the ink layer obtained at step b) is subjected to UV-Vis curing to form the security feature. As used herein, the term "UV-Vis curing" refers to radiation-curing of the ink layer by photo-polymerization, under the influence of an irradiation having wavelength components in the UV or in the UV and visible part of the electromagnetic spectrum (typically 100 nm to 800 nm, preferably between 150 and 600 nm and more preferably between 200 and 400 nm). Cationically curable monomers are cured by cationic mechanisms consisting of the activation by UV-Vis light of one or more photoinitiators, which liberate cationic species, such as acids, which in turn initiate the polymerization of the compound so as to form a cured binder. Radically curable monomers and oligomers are cured by free radical mechanisms consisting of the activation by UV-Vis light of one or more photoinitiators, which liberate free radicals which in turn initiate the polymerization process. Optionally, one or more photosensitizers may also be present. Photosensitizers are activated by one or more of the wavelengths emitted by a UV-Vis light source and reach an excited state. The excited photosensitizer either transfer energy to the one or more photoinitiators (in free-radical polymerization) or an electron (in cationic polymerization). Either process in turn initiates the polymerization process.

Preferably, step c) comprises exposure of the ink layer obtained at step b) to UV-Vis light emitted by a UV-Vis light source selected from the group consisting of: mercury lamps, preferably medium-pressure mercury lamps, UV-LED lamps, and sequences thereof. As evidenced for example by experiments E29a and E29b, for specific UV-Vis radiation curable inks described herein (for e.g. Inks containing a diaryliodonium photoinitiator and a thioxanthone photosensitizer), the UV-Vis light source, namely UV-LED lamp or mercury lamp, used at step c), does not influence the optical properties exhibited by the security feature produced via the manufacturing process described and claimed herein. Typical sequences include the use of one or more UV-LED lamps in a first step to partially cure the UV-Vis radiation composition and one or more medium-pressure mercury lamps in a second step. Mercury lamps advantageously emit on a wide range of wavelengths in the UV-A, UV-B and UV-C range. Accordingly, there is a large selection of photoinitiators or combinations of photoinitiator/photosensitizer having an absorption spectrum matching at least one of the emission band of the mercury lamp. UV-LED have a more limited range of wavelengths, such that only a limited selection of photoinitiators or combination of photoinitiator/photosensitizer is efficient enough at industrial printing speed. On the other hand, UV-LEDs are less costly, require less energy (in particular, they need much less demanding heat dissipation systems), are not prone to ozone formation and have a much longer lifespan.

The UV-Vis radiation curable ink used in the manufacturing process according to the present invention comprises:

i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;

li) from about 40 wt-% to about 75 wt-% of either a cycloaliphatic epoxide, or a mixture of a cycloaliphatic epoxide and one or more UV-Vis radiation curable compounds other than the cycloaliphatic epoxide;

iii) one or more cationic photoinitiators;

iv) a polyvinyl chloride copolymer containing at least about 69 wt-% of vinyl chloride;

v) a perfluoropolyether surfactant functionalized with one or more functional groups selected from the group consisting of: hydroxyl, acrylate, and methacrylate; and optionally
vi) up to 25 wt-% of an organic solvent;
the weight percent of ii), and vi) being based on the total weight of the UV-Vis radiation curable ink.

Preferably, the UV-Vis radiation curable ink is a UV-Vis radiation curable screen printing ink, a UV-Vis radiation curable rotogravure ink, or a UV-Vis radiation curable flexography ink, more preferably a UV-Vis radiation curable screen printing ink. The UV-Vis radiation curable ink used in the inventive manufacturing process claimed herein has a viscosity of between about 50 mPas and about 2000 mPas at 25° C. measured using a Brookfield viscometer (model "DV-I Prime) equipped with a spindle S27 at 100 rpm, or with a spindle S21 at 50 rpm for measuring viscosities between 500 and 2000 mPas, and a spindle S21 at 100 rpm for measuring viscosities equal to or lower than 500 mPas. The UV-Vis radiation curable screen printing ink used in the inventive manufacturing process claimed herein has a viscosity of between about 50 mPas and about 1000 mPas at 25° C., preferably of between about 100 mPas and about 1000 mPas at 25° C.

The silver nanoplatelets contained by the UV-Vis may be in the form of disks, regular hexagons, triangles, especially equilateral triangles, and truncated triangles, especially truncated equilateral triangles, or mixtures thereof. They are preferably in the form of disks, truncated triangles, hexagons, or mixtures thereof.

The mean diameter of the silver nanoplatelets is in the range of 50 to 150 nm, preferably 60 to 140 nm, more preferably 70 to 120 nm, with a standard deviation of less than 60%, preferably less than 50%. The diameter of a silver nanoplatelet is the longest dimension of said silver nanoplatelet and corresponds to the maximum dimension of said silver nanoplatelet when oriented parallel to the plane of a transmission electron spectroscopy image (TEM). As used herein, the term "mean diameter of the silver nanoplatelets" refers to the mean diameter determined by transmission electron spectroscopy (TEM) using Fiji image analysis software based on the measurement of at least 300 randomly selected silver nanoplatelets, wherein the diameter of a silver nanoplatelet is the maximum dimension of said silver nanoplatelet oriented parallel to the plane of a transmission electron spectroscopy image (TEM). TEM analysis was conducted on a dispersion containing 24.1 wt-% silver nanoplatelets in isopropanol using an EM 910 instrument from ZEISS in bright field mode at an e-beam acceleration voltage of 100 kV.

The mean thickness of the silver nanoplatelets is in the range of 5 to 30 nm, preferably 7 to 25 nm, more preferably 8 to 25 nm, with a standard deviation of less than 50%, preferably less than 30%. The thickness of a silver nanoplatelet is the shortest dimension of said nanoplatelet and corresponds to the maximum dimension of said silver nanoplatelet when oriented perpendicular to the plane of a transmission electron spectroscopy image (TEM). As used herein, the term "mean thickness of silver nanoplatelets" refers to the mean thickness determined by transmission electron spectroscopy (TEM) based on the manual measurement of at least 50 randomly selected silver nanoplatelets oriented perpendicular to the plane of the TEM image, wherein the thickness of the silver nanoplatelet is the maximum dimension of said silver nanoplatelet when oriented perpendicular to the plane of a transmission electron spectroscopy image (TEM). TEM analysis was conducted on a dispersion containing 24.1 wt-% silver nanoplatelets in isopropanol using an EM 910 instrument from ZEISS in bright field mode at an e-beam acceleration voltage of 100 kV.

The mean aspect ratio of the silver nanoplatelets (defined as the ratio between the mean diameter and the mean thickness) is larger than 2.0, preferably larger than 2.2 and more preferably larger than 2.5.

Preferably, the mean diameter of the silver nanoplatelets is in the range of 70 to 120 nm with the standard deviation being less than 50%, the mean thickness of said silver nanoplatelets is in the range of 8 to 25 nm with the standard deviation being less than 30% and the mean aspect ratio of said silver nanoplatelets is higher than 2.5.

The silver nanoplatelets used in the UV-Vis radiation curable ink described herein are characterized by a highest wavelength absorption maximum of between 560 and 800 nm, preferably 580 and 800 nm, most preferably 600 to 800 nm. The highest wavelength absorption maximum was measured in water at ca. $5*10^{-5}$ M (mol/l) concentration of silver using a Varian Cary 50 UV-Visible spectrophotometer. The absorption maximum has a full width at half maximum (FWHM) value in the range of 50 to 500 nm, preferably 70 to 450 nm, more preferably 80 to 450 nm. The molar extinction coefficient of the silver nanoplatelets, measured at the highest wavelength absorption maximum, is higher than 4000 L/(cm*$mol_{Ag}$), especially higher than 5000 L/(cm*$mol_{Ag}$), very especially higher than 6000 L/(cm*$mol_{Ag}$).

To prevent agglomeration and sedimentation of the silver nanoplatelets upon storage, the silver nanoplatelets preferably bear one or more surface stabilizing agents.

A preferred embodiment according to the present invention is directed to a process for producing a security feature for securing a value document as claimed and described herein, wherein the silver nanoplatelets bear a surface stabilizing agent of general formula (I)

$$R^1 \left\{ O \underset{R^3}{\overset{R^2}{\left[ \phantom{X} \right]}}_{k1} O \underset{R^4}{\overset{R^5}{\left[ \phantom{X} \right]}}_{k2} O \underset{R^7}{\overset{R^6}{\left[ \phantom{X} \right]}}_{k3} Y \left[ \underset{O}{\phantom{X}} \right]_{k4} \right\}_{k5} S---- \quad (I)$$

on their surface,
wherein —— indicates the bond to the silver,
$R^1$ is H, $C_1$-$C_{18}$alkyl, phenyl, $C_1$-$C_8$alkylphenyl, or $CH_2COOH$;
$R^2$, $R^3$, $R^4$, $R^5$, $R^6$ and $R^7$ are independently of each other H, $C_1$-$C_8$alkyl, or phenyl;
Y is O, or $NR^6$;
$R^8$ is H, or $C_1$-$C_8$alkyl;
k1 is an integer in the range of from 1 to 500,
k2 and k3 are independently of each other 0, or integers in the range of from 1 to 250;
k4 is 0, or 1,
k5 is an integer in the range of from 1 to 5.

Preferably Y is O. Also preferably k4 is 0.
The surface stabilizing agent of general formula (I) has preferably an average molecular weight (Mn) of from 1000 to 20000 [g/mol], and more preferably from 1000 to 10000 [g/mol], most preferably from 1000 to 6000 [g/mol].

If the stabilizing agent of formula (I) comprises, for example, ethylene oxide units (EO) and propylene oxide units (PO), the order of (EO) and (PO) may be fixed (block copolymers), or may not be fixed (random copolymers).

Preferably, $R^1$ is H, or $C_1$-$C_{18}$alkyl, $R^2$, $R^3$, $R^4$, $R^5$, $R^6$ and $R^7$ are independently of each other H, $CH_3$, or $C_2H_5$, k1 is an integer in the range of from 22 to 450, k2 and k3 are independently of each other 0, or integers in the range of from 1 to 250, k4 is 0, or 1, and k5 is an integer in the range of from 1 to 5.

More preferably, $R^1$ is H, or $C_1$-$C_4$alkyl, $R^2$, $R^3$, $R^4$, $R^5$, $R^6$ and $R^7$ are independently of each other H, or $CH_3$, k1 is an integer in the range of from 22 to 450, k2 and k3 are independently of each other 0, or integers in the range of from 1 to 100, k4 is 0, k5 is an integer in the range of from 1 to 4.

The most preferred surface stabilizing agent of general formula (I) has the general formula (Ia)

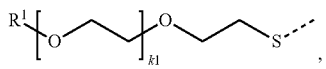

(Ia)

wherein $R^1$ is H, or a $C_1$-$C_8$alkyl group, especially H, or $CH_3$, and k1 is an integer in the range of from 22 to 450, especially 22 to 150.

The preferred surface stabilizing agents are derived from MPEG thiols (poly(ethylene glycol) methyl ether thiols) having an average molecular weight ($M_n$) of 2000 to 6000, such as, for example, MPEG 2000 thiol, MPEG 3000 thiol, MPEG 4000 thiol, MPEG 5000 thiol, MPEG 6000 thiol, PEG thiols (O-(2-mercaptoethyl)-poly(ethylene glycol)) having an average $M_n$ of 2000 to 6000, such as, for example, PEG 2000 thiol, PEG 3000 thiol, PEG 4000 thiol, PEG 5000 thiol, PEG 6000 thiol.

In another preferred embodiment of the present invention, the silver nanoplatelets contained by the UV-Vis radiation curable ink bear a surface stabilizing agent which is a polymer, or copolymer described in WO200674969A1, which can be obtained by a process comprising the steps:

d1) polymerizing in a first step one or more ethylenically unsaturated monomers in the presence of at least one nitroxylether having the structural element

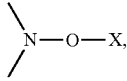

wherein X represents a group having at least one carbon atom and is such that the free radical X● derived from X is capable of initiating polymerization; or d2) polymerizing in a first step one or more ethylenically unsaturated monomers in the presence of at least one stable free nitroxyl radical

and a free radical initiator; wherein at least one monomer used in the steps d1) or d2) is a $C_1$-$C_6$ alkyl or hydroxy $C_1$-$C_6$ alkyl ester of acrylic or methacrylic acid; and optionally e) a second step, comprising the modification of the polymer or copolymer prepared under d1) or d2) by a transesterification reaction, an amidation, hydrolysis or anhydride modification or a combination thereof.

The monomer in step d1) or d2) is preferably selected from 4-vinyl-pyridine or pyridinium-ion, 2-vinyl-pyridine or pyridinium-ion, 1-vinyl-imidazole or imidazolinium-ion, or a compound of formula $CH_2=C(R_a)—(C=Z)—R_b$, wherein $R_a$ is hydrogen or methyl;

$R_b$ is $NH_2$, O-(Me$^+$), unsubstituted $C_1$-$C_{18}$alkoxy, $C_2$-$C_{100}$ alkoxy interrupted by at least one N and/or O atom, or hydroxy-substituted $C_1$-$C_{18}$alkoxy, unsubstituted $C_1$-$C_{18}$akylamino, unsubstituted di($C_1$-$C_{18}$alkyl)amino, hydroxy-substituted $C_1$-$C_{18}$alkylamino or hydroxy-substituted di($C_1$-$C_{18}$alkyl)amino, —O(CH$_2$)$_y$NR$^{15}$R$^{16}$ or —O(CH$_2$)$_y$N$^+$HR$^{15}$R$^{18}$An$^-$, —N(CH$_2$)$_y$NR$^{15}$R$^{16}$, or —N(CH$_2$)$_y$N$^+$HR$^{15}$R$^{16}$An$^-$, wherein An$^-$ is an anion of a monovalent organic, or inorganic acid;

y is an integer from 2 to 10;

$R^{15}$ is saturated or unsaturated, linear or branched chain alkyl with 1-22 carbon atoms;

$R^{16}$ is saturated or unsaturated, linear or branched chain alkyl with 1-22 carbon atoms;

Me$^+$ is a monovalent metal atom or the ammonium ion; and

Z is oxygen or sulfur.

The second step e) is preferably a transesterification reaction. In step e) the alcohol is preferably an ethoxylate of formula (A)

$$R_A-[O-CH_2-CH_2-]_n-OH \qquad (A),$$

wherein $R_A$ is saturated or unsaturated, linear or branched chain alkyl with 1-22 carbon atoms, or alkylaryl or dialkylaryl with up to 24 carbon atoms and n is 1 to 150.

Preferably, step d1) or d2) is carried out twice and a block copolymer is obtained wherein in the first or second radical polymerization step the monomer or monomer mixture contains 50 to 100% by weight, based on total monomers, of a $C_1$-$C_6$ alkyl ester of acrylic or methacrylic acid and in the second or first radical polymerization step respectively, the ethylenically unsaturated monomer or monomer mixture contains at least a monomer without primary or secondary ester bond.

In the first polymerization step, the monomer or monomer mixture contains from 50 to 100% by weight based on total monomers of a $C_1$-$C_5$ alkyl ester of acrylic or methacrylic acid (first monomer) and in the second polymerization step the ethylenically unsaturated monomer or monomer mixture comprises 4-vinyl-pyridine or pyridinium-ion, 2-vinyl-pyridine or pyridinium-ion, vinyl-imidazole or imidazolinium-ion, 3-dimethylaminoethylacrylamide, 3-dimethylaminoethylmethacrylamide, or corresponding ammonium ion, 3-dimethylaminopropylacrylamide, or corresponding ammonium ion, or 3-dimethylaminopropylmethacrylamide, or corresponding ammonium ion (second monomer).

The nitroxylether is preferably a compound of formula (O1).

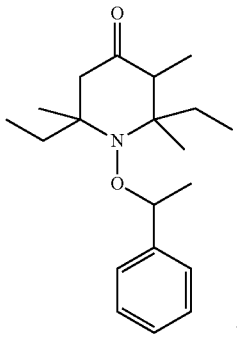

(O1)

The surface stabilization agent is preferably a copolymer which can be obtained by a process comprising the steps:

d1) polymerizing in a first step a first monomer, which is a $C_1$-$C_6$ alkyl or hydroxy $C_1$-$C_6$ alkyl ester of acrylic or methacrylic acid, and a second monomer which is selected from selected from 4-vinyl-pyridine or pyridinium-ion, 2-vinyl-pyridine or pyridinium-ion, 1-vinyl-imidazole or imidazolinium-ion, 3-dimethylaminoethylacrylamide, 3-dimethylaminoethylmethacrylamide, 3-dimethylamino-propylacrylamide, and 3-dimethylaminopropylmethacrylamide; in the presence of at least one nitroxylether having the structural element

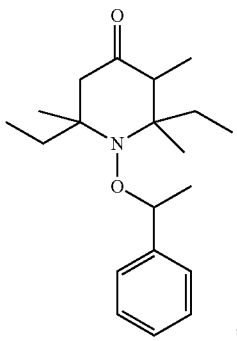

;

and e) a second step, comprising the modification of the polymer or copolymer prepared under d1) by a transesterification reaction, wherein the alcohol in step e) is an ethoxylate of formula $R_A$—[O—CH$_2$—CH$_2$—]$_{n1}$—OH    (A), wherein $R_A$ is saturated or unsaturated, linear or branched chain alkyl with 1-22 carbon atoms, or alkylaryl or dialkylaryl with up to 24 carbon atoms and n1 is 1 to 150.

Preferably the surface stabilizing agent obtained via the process described herein is a copolymer of the following formula (III)

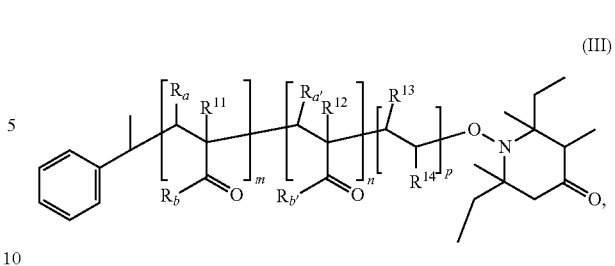

(III)

wherein $R^{11}$ and $R^{12}$ are H, or methyl, $R^{13}$, $R_a$ and $R_{a'}$ are independently of each other H, or methyl, $R_b$ is saturated or unsaturated, linear or branched chain alkyl with 1-22 carbon atoms, $R_{b'}$ is $R_A$—[O—CH$_2$—CH$_2$]$_{n1}$—O—, $R^{14}$ is

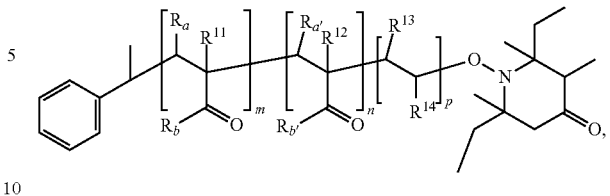

-C(=O)-NH-(CH$_2$)$_y$NR$^{15}$R$^{16}$, or -C(=O)-NH-(CH$_2$)$_y$N$^+$HR$^{15}$R$^{16}$An$^-$ ;

wherein

An$^-$ is an anion of a monovalent organic, or inorganic acid;

y is an integer from 2 to 10;

$R^{15}$ is saturated or unsaturated, linear or branched chain alkyl with 1-22 carbon atoms, $R^{16}$ is saturated or unsaturated, linear or branched chain alkyl with 1-22 carbon atoms, $R_A$ is saturated or unsaturated, linear or branched chain alkyl with 1-22 carbon atoms, or alkylaryl or dialkylaryl with up to 24 carbon atoms and n1 is 1 to 150, m, n and p are independently of each other integers from 1 to 200, and is an integer from 1 to 150.

More preferably, the surface stabilizing agent is a copolymer represented by formula (III)

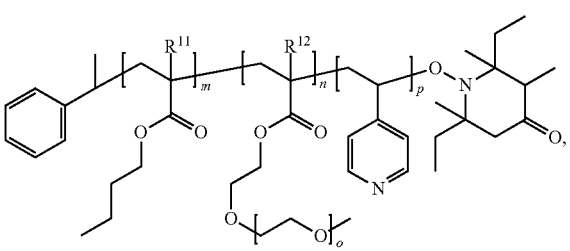

(III)

wherein $R^{11}$ and $R^{12}$ are H or methyl, m, n and p are independently of each other integers from 1 to 200, and is an integer from 1 to 150. The order of monomers with indices m and n may be fixed (block copolymers) or not fixed (random copolymers).

Examples of preferred copolymers to be used as stabilizing agents are the copolymers described in Example A3 and Example A6 of WO200674969A1.

To improve the stability of optical properties of the silver nanoplatelets upon storage or heat exposure, the UV-Vis radiation curable ink may further comprise a stabilizing agent, such a compound of general formula (IIa), (IIb) or (IIc).

The stabilizing agent may be a compound of formula $R^{20}$—X (IIa), wherein $R^{20}$ is a linear or branched $C_1$-$C_{25}$alkyl group, or $C_2$-$C_{25}$alkenyl group, which may be substituted by one, or more groups selected from —OH, —SH, —NH$_2$, or —COOR$^{19}$, wherein $R^{19}$ is a hydrogen atom, or a $C_1$-$C_{25}$alkyl group, and X is —OH, —SH, —NH$_2$, or —COOR$^{19'}$, wherein $R^{19'}$ is a hydrogen atom, a $C_1$-$C_{25}$alkyl group, or a $C_2$-$C_{25}$alkenyl group, which may be substituted by one, or more groups selected from —OH, —SH, —NH$_2$, or —COOR$^{19''}$, wherein $R^{19''}$ is a hydrogen atom, or a $C_1$-$C_{25}$alkyl group.

Examples of compounds of formula (IIa) are 1-methylamine, 1-dodecylamine, 1-hexadecylamine, citric acid, oleic acid, D-cysteine, 1-dodecanethiol, 9-mercapto-1-nonanol, 1-thioglycerol, 11-amino-1-undecanethiol, cysteamine, 3-mercaptopropanoic acid, 8-mercaptooctanoic acid and 1,2-ethanedithiol.

The stabilizing agent may be a compound of formula (IIb)

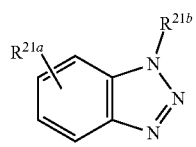

(IIb)

wherein $R^{21a}$ is a hydrogen atom, a halogen atom, a $C_1$-$C_8$alkoxy group, or a $C_1$-$C_8$alkyl group;

$R^{21b}$ is a hydrogen atom, or a group of formula —CHR$^{24}$—N(R$^{22}$(R$^{23}$), and $R^{22}$ and $R^{23}$ are independently of each other a $C_1$-$C_8$alkyl, a hydroxyC$_1$-$C_8$alkyl group, or a group of formula—[CH$_2$CH$_2$)—O]$_{n2}$—CH$_2$CH$_2$—OH, wherein n2 is 1 to 5, $R^{24}$ is H or $C_1$-$C_8$alkyl.

Examples of compounds of formula (IIb) include, but are not limited to:

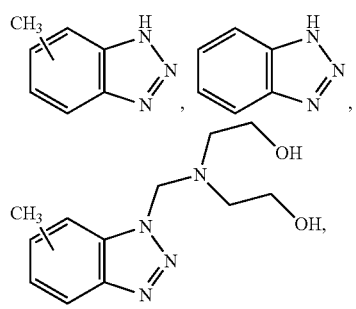

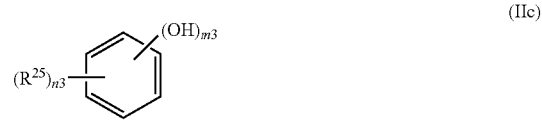

, and

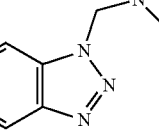

The stabilizing agent may be a "polyhydric phenol" i.e. a compound, containing an optionally substituted benzene ring and at least 2 hydroxy groups attached to it. The term "polyhydric phenol" comprises polyphenols, such as, for example, tannic acid and polycyclic aromatic hydrocarbons which consist or fused benzene rings, wherein at least one benzene ring has at least 2 hydroxy groups attached to it, such as, for example, 1,2-dihydroxynaphthalene. The "polyhydric phenol" may be substituted. Suitable substituents are described below.

In a preferred embodiment, the polyhydric phenol stabilizing agent contained by the UV-Vis radiation curable ink described herein is a polyhydric phenol of general formula (IIc)

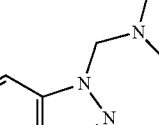

(IIc)

wherein $R^{25}$ is the same, or different in each occurrence and is a hydrogen atom, a halogen atom, a $C_1$-$C_{18}$alkyl group, a $C_1$-$C_{18}$alkoxy group, or a group —C(=O)—R$^{26}$;

$R^{25}$ is a hydrogen atom, a hydroxy group, a $C_1$-$C_{18}$alkyl group, unsubstituted or substituted amino group, unsubstituted or substituted phenyl group, or a $C_1$-$C_{18}$alkoxy group;

n3 is an integer comprised between 1 and 4;
m3 is an integer comprised between 2 and 4, and
the sum of the integers m3 and n3 is 6.

In a more preferred embodiment, the polyhydric phenol stabilizing agent contained by the UV-Vis radiation curable ink is a polyhydric phenol of general formula (IIc')

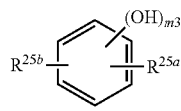

(IIc')

wherein
R$^{25a}$ and R$^{25b}$ are independently of each other a hydrogen atom, a C$_1$-C$_{18}$alkyl group, a C$_1$-C$_{18}$alkoxy group, or a group of formula —C(=O)—R$^{26}$;
R$^{26}$ is a hydrogen atom, a hydroxy group, a C$_1$-C$_{18}$alkyl group, an unsubstituted or substituted amino group, unsubstituted or substituted phenyl group, or a C$_1$-C$_{18}$alkoxy group; and
m3 is an integer comprised between 2 and 4, especially 2 to 3. Polyhydric phenols general formula (IIc') having two hydroxy groups in the ortho-position are especially preferred.

In an even more preferred embodiment, the polyhydric phenol stabilizing agent contained by the UV-Vis radiation curable ink is a polyhydric phenol of general formula (IIc"):

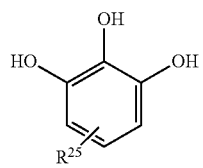

(IIc")

wherein
R$^{25}$ is a hydrogen atom, or a group of formula —C(=O)—R$^{25}$, wherein R$^2$ is a hydrogen atom, a C$_1$-C$_{18}$alkyl group, or a C$_1$-C$_{18}$alkoxy group, an unsubstituted or substituted amino group, especially a C$_1$-C$_{18}$alkyl group or C$_1$-C$_6$alkoxy group.

A polyhydric phenol of general formula (IIc''')

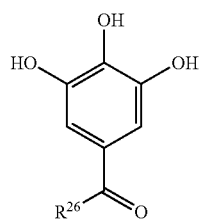

(IIc''')

wherein
R$^{26}$ is a hydrogen atom, a C$_1$-C$_{18}$alkyl group, or a C$_1$-C$_{18}$alkoxy group, especially a C$_1$-C$_8$alkoxy group, is especially preferred as stabilizing agent. Examples of polyhydric phenols of general formula (IIc''') include, but are not limited to:

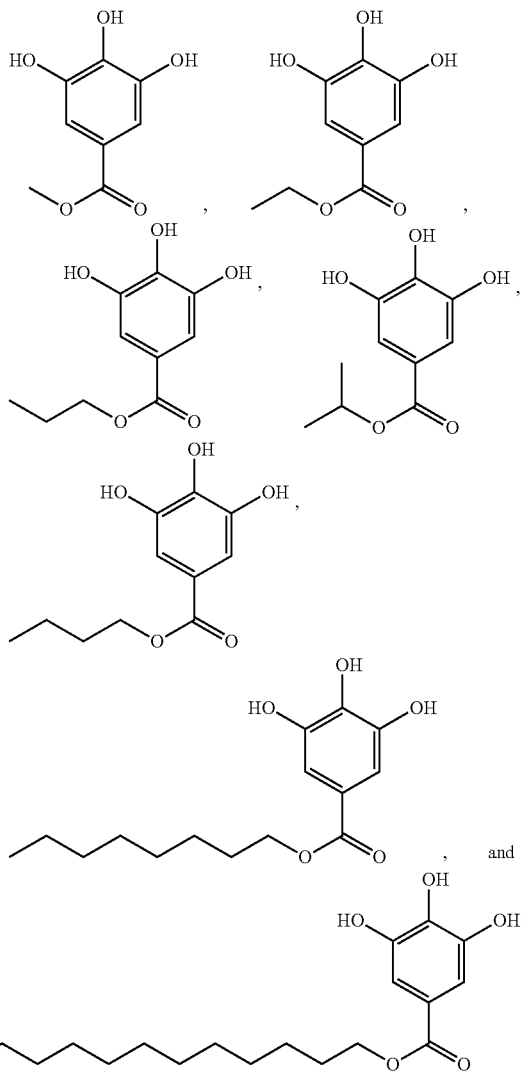

Further polyhydric phenol stabilizing agents include compounds having one of the following formulae:

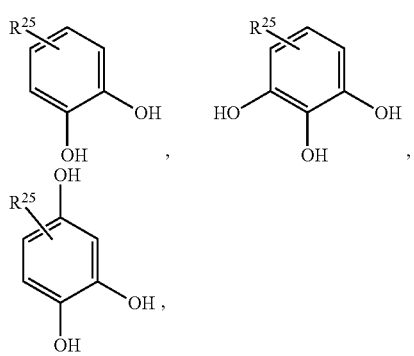

wherein R$^{25}$ is a hydrogen atom, a C$_1$-C$_{18}$alkyl group, or a group of formula —C(=O)—R$^{26}$, wherein R$^{26}$ is a hydrogen atom, a hydroxy group, a C$_1$-C$_{18}$alkyl group, or a C$_1$-C$_{18}$alkoxy group, an unsubstituted or substituted amino group, an unsubstituted or substituted phenyl group, especially a $C_1$-$C_{18}$alkyl group or $C_1$-$C_8$alkoxy group. Examples of such polyhydric phenols include:

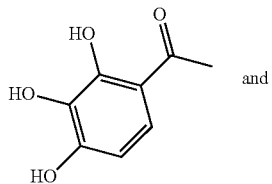

and

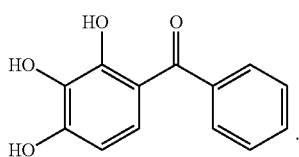

In a particularly preferred embodiment, the stabilizing agent is selected from compounds of formula (IIb), (IIc), and mixtures thereof.

A preferred embodiment according to the present invention relates to a manufacturing process of security features as described and claimed herein, wherein the silver nanoplatelets bear one or more surface stabilizing agents of general formula (I) and one or more surface stabilizing agents of general formula (III), and the UV-Vis radiation curable ink comprises one or more stabilizing agents of general formula (IIb).

A dispersion of silver nanoplatelets to be used for preparing the UV-Vis radiation curable ink used in the manufacturing process according to the present invention may be accessed by using the following method:

(A) preparing a solution comprising a silver precursor, a compound of formula

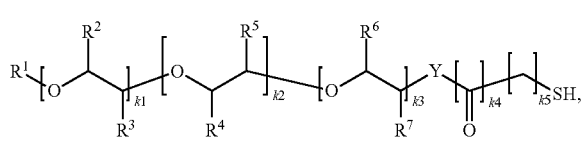

(I')

wherein
$R^1$ is H, $C_1$-$C_{18}$alkyl, phenyl, $C_1$-$C_8$alkylphenyl, or $CH_2COOH$;
$R^2$, $R^3$, $R^4$, $R^5$, $R^6$ and $R^7$ are independently of each other H, $C_1$-$C_8$alkyl, or phenyl;
Y is O, or $NR^8$;
$R^8$ is H, or $C_1$-$C_8$alkyl;
k1 is an integer in the range of from 1 to 500;
k2 and k3 are independently of each other 0, or integers in the range of from 1 to 250;
k4 is 0, or 1; and
k5 is an integer in the range of from 1 to 5, a polymer, or copolymer, which can be obtained by a process comprising the steps:
D1) polymerizing in a first step one or more ethylenically unsaturated monomers in the presence of at least one nitroxylether having the structural element

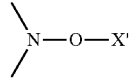

wherein X represents a group having at least one carbon atom and is such that the free radical X● derived from X is capable of initiating polymerization; or
D2) polymerizing in a first step one or more ethylenically unsaturated monomers in the presence of at least one stable free nitroxyl radical

and a free radical initiator; wherein at least one monomer used in the steps D1) or D2) is a $C_1$-$C_6$ alkyl or hydroxy $C_1$-$C_6$ alkyl ester of acrylic or methacrylic acid; and optionally
E) a second step, comprising the modification of the polymer or copolymer prepared under D1) or D2) by a transesterification reaction, an amidation, hydrolysis or anhydride modification or a combination thereof,
water, and optionally a defoamer;
(B1) preparing a solution, comprising a reducing agent, which comprises at least one boron atom in the molecule, and water;
(B2) adding the solution obtained at step (A) to the solution obtained at step (B1), and adding one or more complexing agents:
(C) adding a hydrogen peroxide solution in water; and
(D) optionally adding a stabilization agent to the mixture obtained at step (C).

The silver precursor is a silver(I) compound selected from the group consisting of: $AgNO_3$; $AgClO_4$; $Ag_2SO_4$; $AgCl$; $AgF$; $AgOH$; $Ag_2O$; $AgBF_4$; $AgIO_3$; $AgPF_6$; $R^{200}CO_2Ag$, $R^{200}SO_3Ag$, wherein $R^{200}$ is unsubstituted or substituted $C_1$-$C_{18}$alkyl, unsubstituted or substituted $C_5$-$C_8$cycloalkyl, unsubstituted or substituted $C_7$-$C_{18}$aralkyl, unsubstituted or substituted $C_5$-$C_{18}$aryl or unsubstituted or substituted $C_2$-$C_{18}$heteroaryl; Ag salts of dicarboxylic, tricarboxylic, polycarboxylic acids, polysulfonic acids, P-containing acids and mixtures thereof, preferably from the group consisting of: silver nitrate, silver acetate, silver perchlorate, silver methanesulfonate, silver benzenesulfonate, silver toluenesulfonate silver trifluoromethanesulfonate, silver sulfate, silver fluoride and mixtures thereof, and more preferably is silver nitrate.

The reducing agent is selected from the group consisting of alkali, or alkaline earth metal borohydrides, such as sodium borohydride, alkali, or alkaline earth metal acyloxyborohydrides, such as sodium triacetoxyborohydride, alkali, or alkaline earth metal alkoxy- or aryloxyborohydrides, such as sodium trimethoxyborohydride, aryloxyboranes, such as catecholborane, and amine-borane complexes, such as diethylaniline borane, tert-butylamine borane, morpholine borane, dimethylamine borane, triethylamine borane, pyridine borane, ammonia borane and mixtures thereof. Sodium borohydride is most preferred.

The one or more complexing agents are selected from the group of chlor-containing compounds, which are capable to liberate chloride ions under reaction conditions, such as metal chlorides, alkyl or aryl ammonium chlorides, phosphonium chlorides; primary or secondary amines and corresponding ammonium salts, such as methyl amine or dimethylamine; ammonia and corresponding ammonium salts; and aminocarboxylic acids and their salts, such as ethylenediaminetetraacetic acid.

Non limiting examples of complexing agents include ammonia, methylamine, dimethylamine, ethylamine, ethylenediamine, diethylenetriamine, ethylene-diamine-tetraacetic acid (EDTA), ethylenediamine N,N'-disuccinic acid (EDDS), methyl glycine diacetic acid (MGDA), diethylene triamine pentaacetic acid (DTPA), propylene diamine tetracetic acid (PDTA), glutamic acid N,N-diacetic acid (N,N-dicarboxymethyl glutamic acid tetrasodium salt (GLDA), nitrilotriacetic acid (NTA), and any salts thereof, N-hydroxyethylethylenediaminetri-acetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof, such as, for example, trisodium salt of methylglycinediacetic acid (Na$_3$MGDA) and tetrasodium salt of EDTA.

The defoamer is a compound or composition, capable to suppress foam formation in the reaction mixture, such as, for example, commercially available TEGO® Foamex 1488, 1495, 3062, 7447, 800, 8030, 805, 8050, 810, 815N, 822, 825, 830, 835, 840, 842, 843, 845, 855, 860, 883, K 3. K 7, K 8, N. Antifoam SE-15 from Sigma, Struktol SB-2080 and the like. The amount of the defoamer is in the range of from 0.00001% to 5% by weight based on total weight of reaction mixture prior to hydrogen peroxide addition, preferably from 0.0001% to 3% and more preferably from 0.001% to 2% by weight.

The defoamer can be added to the solution prepared at step (A) and/or to the solution prepared at step (B).

The reaction of silver nanoplatelets formation is carried out by gradually adding the silver precursor solution to the reducing agent solution, whereas the temperature of both solutions is in the range of −3° C. to 40° C. and the gradual addition is completed within 15 minutes to 24 h time.

The silver nanoplatelets can be further submitted to further purification and/or isolation methods, such as decantation, (ultra)filtration. (ultra)centrifugation, reversible or irreversible agglomeration, phase transfer with organic solvent, and combinations thereof. The dispersion of silver nanoplatelets may contain up to about 99 wt-% silver nanoplatelets, preferably from 5 wt-% to 99 wt-% silver nanoplatelets, more preferably from 5 wt-% to 90 wt-% silver nanoplatelets, the wt-% being based on the total weight of the dispersion.

The silver nanoplatelets used herein are described by the international patent application publication number WO2020224982A1.

A preferred embodiment according to the present invention is directed to a manufacturing process of security features as described and claimed herein, wherein the UV-Vis radiation curable ink comprises a concentration of silver nanoplatelets from about 5 wt-% to about 20 wt-%, preferably from about 7.5 wt-% to about 17.5 wt-%, more preferably from about 10 wt-% to about 15 wt-%, for example about 12.5 wt-%, wherein the weight percents are based on the total weight of the UV-Vis radiation curable ink. The concentration of silver nanoplatelets in the UV-Vis radiation curable ink used in the process according to the present invention is significantly lower than the concentrations of silver platelets used in the inks of the prior art. Hence, the manufacturing process claimed herein allows the production in a cost-efficient manner of dichroic security features with optical effects similar to the ones of the prior art, but significantly improved mechanical resistance properties.

According to one embodiment, the UV-Vis radiation curable ink used in the manufacturing process claimed and described herein is a cationically curable ink (i.e. an ink containing exclusively cationically curable monomers and no radically curable monomers) and comprises:

i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;

ii-1) from about 40 wt-% to about 75 wt-% of a cycloaliphatic epoxide;

iii) one or more cationic photoinitiators;

iv) a polyvinyl chloride copolymer containing at least about 69 wt-% of vinyl chloride;

v) a perfluoropolyether surfactant functionalized with one or more functional groups selected from the group consisting of: hydroxyl, acrylate, and methacrylate; and optionally vi) up to 25 wt-% of an organic solvent;

the weight percent of ii-1), and vi) being based on the total weight of the UV-Vis radiation curable ink.

In an alternative embodiment according to the present invention, the UV-Vis radiation curable ink comprises:

i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;

ii-5) from about 40 wt-% to about 75 wt-% of a mixture of a cycloaliphatic epoxide and one or more UV-Vis radiation curable compounds other than the cycloaliphatic epoxide:

iii) one or more cationic photoinitiators;

iv) a polyvinyl chloride copolymer containing at least about 69 wt-% of vinyl chloride:

v) a perfluoropolyether surfactant functionalized with one or more functional groups selected from the group consisting of: hydroxyl, acrylate, and methacrylate; and optionally vi) up to 25 wt-% of an organic solvent, the weight percent of ii-5), and vi) being based on the total weight of the UV-Vis radiation curable ink. The one or more UV-Vis radiation curable compounds other than the cycloaliphatic epoxide may comprise vii) one or more cationically curable monomers other than the cycloaliphatic epoxide and/or viii) one or more radically curable monomers and/or oligomers. If the one or more UV-Vis radiation curable compounds other than the cycloaliphatic epoxide comprise viii) one or more radically curable monomers and/or oligomers, then the UV-Vis radiation curable ink further comprises ix) one or more free radical photoinitiators. Preferably, if the one or more UV-Vis radiation curable compounds other than the cycloaliphatic epoxide comprise vii) one or more cationically curable monomers other than the cycloaliphatic epoxide, then the ratio between the weight percent (wt-%) of the cycloaliphatic epoxide present in said ink and the weight percent (wt-%) of the one or more cationically curable monomers other than the cycloaliphatic epoxide present in said ink is higher than about 1.1:1. Also preferably, if the one or more UV-Vis radiation curable compounds other than the cycloaliphatic epoxide comprise viii) one or more radically curable monomers and/or oligomers, then the ratio between the weight percent (wt-%) of the one or more radically curable monomers and/or oligomers present in said ink and the sum of the weight percents of the cationically curable monomers including the cycloaliphatic epoxide present in said ink is lower than about 1.6:1, preferably lower than about 1.53:1, the weight percent (wt-%) being based on the total weight of said ink.

Thus, in a preferred embodiment according to the present invention, the UV-Vis radiation curable ink used in the manufacturing process claimed and described herein is a cationically curable ink comprising:
  i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;
  ii-2) from about 40 wt-% to about 75 wt-% of a mixture of a cycloaliphatic epoxide and one or more cationically curable monomers other than the cycloaliphatic epoxide;
  iii) one or more cationic photoinitiators;
  iv) a polyvinyl chloride copolymer containing at least about 69 wt-% of vinyl chloride;
  v) a perfluoropolyether surfactant functionalized with one or more functional groups selected from the group consisting of: hydroxyl, acrylate, and methacrylate; and optionally
  vi) up to 25 wt-% of an organic solvent;
  the weight percent of 11-2), and vi) being based on the total weight of the UV-Vis radiation curable ink. Preferably, the ratio between the weight percent (wt-%) of the cycloaliphatic epoxide present in said ink and the weight percent (wt-%) of the one or more cationically curable monomers other than the cycloaliphatic epoxide present in said ink is higher than about 1.1:1, the weight percent (wt-%) being based on the total weight of said ink. More preferably, the cycloaliphatic epoxide present in the cationically curable ink is in an amount from about 20 wt-% to about 70 wt-% based on the total weight of said ink, and the one or more cationically curable monomers other than the cycloaliphatic epoxide present in the cationically curable ink are in an amount from about 5 wt-% to about 20 wt-% based on the total weight of the UV-Vis radiation curable ink with the proviso that the ratio between the weight percent (wt-%) of the cycloaliphatic epoxide present in said ink and the weight percent (wt-%) of the one or more cationically curable monomers other than the cycloaliphatic epoxide present in said ink is higher than about 1.1:1.

In a further preferred alternative embodiment according to the present invention, the UV-Vis radiation curable ink is a hybrid ink (i.e. an ink comprising both cationically curable monomers and radically curable monomers) comprising:
  i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;
  ii-3) from about 40 wt-% to about 75 wt-% of a mixture of a cycloaliphatic epoxide and one or more radically curable monomers and/or oligomers;
  iii) one or more cationic photoinitiators;
  v) a polyvinyl chloride copolymer containing at least about 69 wt-% of vinyl chloride;
  v) a perfluoropolyether surfactant functionalized with one or more functional groups selected from the group consisting of: hydroxyl, acrylate, and methacrylate;
  ix) one or more free radical photoinitiators; and optionally
  vi) up to 25 wt-% of an organic solvent;
  the weight percent of 11-3), and vi) being based on the total weight of the UV-Vis radiation curable ink. Preferably, the ratio between the weight percent (wt-%) of the one or more radically curable monomers and/or oligomers present in the hybrid ink and the weight percent (wt-%) of the cycloaliphatic epoxide present in said hybrid ink is lower than about 1.6:1, more preferably lower than about 1.53:1, the weight (wt-%) being based on the total weight of said ink. In a more preferred embodiment, the hybrid ink comprises from about 25 wt-% to about 65 wt-% of a cycloaliphatic epoxide and from about 10 wt-% to about 40 wt-% of one or more radically curable monomers and/or oligomers, with the proviso that the ratio between the weight percent (wt-%) of the one or more radically curable monomers and/or oligomers present in the hybrid ink and the weight percent (wt-%) of the cycloaliphatic epoxide present in said hybrid ink is lower than about 1.6:1, preferably lower than about 1.53:1, the weight percent (wt-%) being based on the total weight of said curable ink.

In an alternative preferred embodiment, the UV-Vis radiation curable ink used in the manufacturing process claimed and described herein is a hybrid ink (i.e. an ink comprising both cationically curable monomers and radically curable monomers) comprising:
  i) silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy;
  ii-4) from about 40 wt-% to about 75 wt-% of a mixture of a cycloaliphatic epoxide, one or more cationically curable monomers other than the cycloaliphatic epoxide, and one or more radically curable monomers and/or oligomers;
  iii) one or more cationic photoinitiators;
  iv) a polyvinyl chloride copolymer containing at least about 69 wt-% of vinyl chloride;

v) a perfluoropolyether surfactant functionalized with one or more functional groups selected from the group consisting of: hydroxyl, acrylate, and methacrylate;
ix) one or more free radical photoinitiators; and optionally
vi) up to 25 wt-% of an organic solvent; the weight percent of I1-4), and vi) being based on the total weight of the UV-Vis radiation curable ink. Preferably, the ratio between the weight percent (wt-%) of the one or more radically curable monomers and/or oligomers present in the UV-Vis radiation hybrid curable ink and the sum of the weight percent (wt-%) of the cycloaliphatic epoxide present in said UV-Vis radiation hybrid curable ink and the weight percent (wt-%) of the one or more cationically curable monomers other than the cycloaliphatic epoxide present in said UV-Vis radiation hybrid curable ink is lower than about 1.6:1, more preferably lower than about 1.53:1, and the ratio between the weight percent (wt-%) of the cycloaliphatic epoxide present in said UV-Vis radiation hybrid curable ink and the weight percent (wt-%) of the one or more cationically curable monomers other than the cycloaliphatic epoxide present in said UV-Vis radiation hybrid curable ink is higher than about 1.1:1; the weight percent (wt-%) being based on the total weight of said curable ink. In a more preferred embodiment, the hybrid ink comprises from about 10 wt-% to about 65 wt-% of a cycloaliphatic epoxide, from 5 wt-% to about 20 wt-% of one or more cationically curable monomers other than the cycloaliphatic epoxide, and from about 10 wt-% to about 40 wt-% of one or more radically curable monomers and/or oligomers, with the proviso that the ratio between the weight percent (wt-%) of the one or more radically curable monomers and/or oligomers present in said ink and the sum of the weight percent (wt-%) of the cycloaliphatic epoxide present in said ink and the weight percent (wt-%) of the one or more cationically curable monomers other than the cycloaliphatic epoxide present in said ink is lower than about 1.6:1, more preferably lower than about 1.53:1, and the ratio between the weight percent (wt-%) of the cycloaliphatic epoxide present in said ink and the weight percent (wt-%) of the one or more cationically curable monomers other than the cycloaliphatic epoxide present in said ink is higher than about 1.1:1, the weight percent (wt-%) being based on the total weight of the hybrid ink.

Experiments E15-E19 according to the present invention show that similar optical properties can be obtained with a UV-Vis radiation hybrid curable ink as described herein (i.e. an ink containing both cationically curable monomers and radically curable monomers) and a cationically curable ink (i.e. an ink containing exclusively cationically curable monomers and no radically curable monomers).

Advantageously, the process claimed and described herein relying upon the use of the UV-Vis radiation cationically curable ink described herein or of the UV-Vis radiation hybrid curable ink described herein provides security features with improved mechanical properties as compared to similar security features known in the art, which are obtained from UV radically curable inks or solvent-based inks, and particularly from UV radically curable inks or solvent-based inks containing high concentrations of silver nanoplatelets.

The UV-Vis radiation curable ink described herein contains a cycloaliphatic epoxide, which as well known to the skilled person is a cationically curable monomer. The cycloaliphatic epoxide described herein may be difunctional or polyfunctional. Preferably, the cycloaliphatic epoxide described herein comprises at least one cyclohexane group, and at least two epoxide groups. Preferably, the cycloaliphatic epoxide is a compound of general formula (IV):

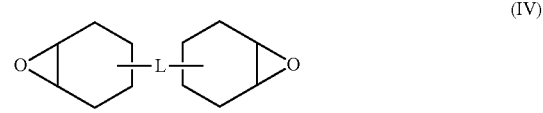

(IV)

wherein -L- represents a single bond or a divalent group comprising one or more atoms. The cycloaliphatic epoxide of general formula (IV) is optionally substituted by one or more linear or branched alkyl radicals containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl).

In the general formula (IV), the divalent group -L- may be a straight- or branched-chain alkylene group comprising from one to eighteen carbon atoms. Examples of said straight- or branched-chain alkylene group include without limitation methylene group, methylmethylene group, dimethylmethylene group, ethylene group, propylene group, and trimethylene group.

In the general formula (IV), the divalent group -L- may be a divalent alicyclic hydrocarbon group or cycloalkydene group such as 1,2-cyclopentylene group, 1,3-cyclopentylene group, cyclopentylidene group, 1,2-cyclohexylene group, 1,3-cyclohexylene group, 1,4-cyclohexylene group, and cyclohexylidene group.

In the general formula (IV), -L- may be a divalent group comprising one or more oxygen-containing linkage groups, wherein said oxygen-containing linkage groups are selected from the group consisting of —C(=O)—, —OC(=O)O—, —C(=O)O—, and —O—. Preferably, the cycloaliphatic epoxide is a cycloaliphatic epoxide of general formula (IV), wherein -L- is a divalent group comprising one or more oxygen-containing linkage groups, wherein said oxygen-containing linkage groups are selected from the group consisting of —C(=O)—, —OC(=O)O—, —C(=O)C—, and —O—, and more preferably a cycloaliphatic epoxide of general formula (IV-a), (IV-b), or (IV-c), as defined below:

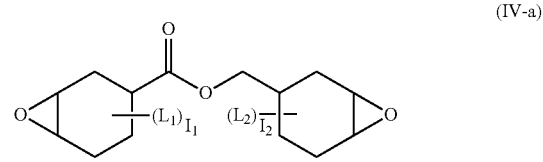

(IV-a)

wherein
$L^1$ can be the same, or different in each occurrence and is a linear or branched alkyl radical containing from one to ten carbon atoms (such as methyl, ethyl, n-propyl, i-propyl, n-butyl, 1-butyl, s-butyl, t-butyl, hexyl, octyl, and decyl), and preferably containing from one to three carbon atoms (such as methyl, ethyl, n-propyl, and P-propyl);
$L^2$ can be the same, or different in each occurrence and is a linear or branched alkyl radical containing from one to ten carbon atoms (such as methyl, ethyl, n-propyl, P-propyl, n-butyl, i-butyl, s-butyl, t-butyl, hexyl, octyl, and decyl), and preferably containing from one to three carbon atoms (such as methyl, ethyl, n-propyl, and i-propy); and
I1 and I2 are independently of each other integers comprised between 0 and 9, preferably comprised between 0 and 3;

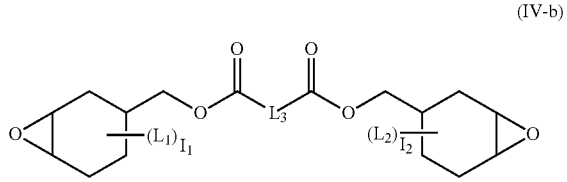

(IV-b)

wherein
$L^1$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);
$L^2$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl); and
I1 and I2 are independently of each other integers comprised between 0 and 9, preferably comprised between 0 and 3;
-$L^3$- is a single bond or a linear or branched divalent hydrocarbon group containing from one to ten carbon atoms, and preferably containing from 3 to 8 carbon atoms, such as alkylene groups including trimethylene, tetramethylene, hexamethylene, and 2-ethylhexylene, and cycloalkylene groups such as 1,2-cyclohexylene group, 1,3-cyclohexylene group, and 1,4-cyclohexylene group, and cyclohexylidene group;

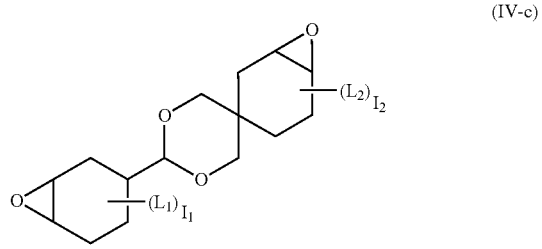

(IV-c)

wherein
$L^1$ can be the same, or different in each occurrence and is a linear or branched alkyl radical containing from one to three carbon atoms, such as methyl, ethyl, n-propyl, and 1-propyl;
$L^2$ can be the same, or different in each occurrence and is a linear or branched alkyl radical containing from one to three carbon atoms, such as methyl, ethyl, n-propyl, and i-propyl; and
I1 and I2 are independently of each other integers comprised between 0 and 9, preferably comprised between 0 and 3.
Preferred cycloaliphatic epoxides of general formula (IV-a) include, but are not limited to: 3,4-epoxycyclohexylmethyl-3,4-epoxycyclohexanecarboxylate, 3,4-epoxy-6-methyl-cyclohexylmethyl-3,4-epoxy-6-methylcyclohexanecarboxylate, 3,4-epoxy-2-methyl-cyclohexylmethyl-3,4-epoxy-2-methyl-cyclohexanecarboxylate, and 3,4-epoxy-4-methyl-cyclohexylmethyl-3,4-epoxy-4-methylcyclohexanecarboxylate.

Preferred cycloaliphatic epoxides of general formula (IV-b) include, but are not limited to: bis(3,4-epoxycyclohexyl-methyl)adipate, bis(3,4-epoxy-6-methylcyclohexylmethyl) adipate, bis(3,4-epoxycyclohexylmethyl)oxalate, bis(3,4-epoxycyclohexylmethyl)pimelate, and bis(3,4-epoxycyclohexylmethyl) sebacate.

A preferred cycloaliphatic epoxide of general formula (IV-c) is 2-(3,4-epoxycyclohexyl-5,5-spiro-3,4-epoxy)cyclohexane-meta-dioxane.

Further cycloaliphatic epoxides include a cycloaliphatic epoxide of general formula (V) and a cycloaliphatic epoxide of general formula (VI), which are optionally substituted by one or more linear or branched alkyl groups containing from one to ten carbon atoms (such as methyl, ethyl, n-propyl, -propyl, n-butyl, i-butyl, s-butyl, t-butyl, hexyl, octyl, and decy), and preferably containing from one to three carbon atoms (such as methyl, ethyl, n-propyl, and -propy).

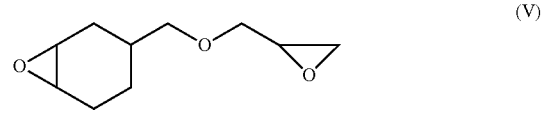

(V)

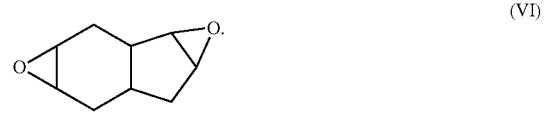

(VI)

The cycloaliphatic epoxides described herein may be hydroxy modified or (meth)acrylate modified. Examples are commercially available under the name cyclomer A400 (CAS: 64630-63-3) and Cyclomer M100 (CAS number: 82428-30-6) by Daicel Corp., or TTA 15 and TTA16 by TetraChem/Jiangsu.

The UV-Vis radiation curable ink described herein contains one or more cationic photoinitiators. Preferably, the concentration of the one or more cationic photoinitiators in the UV-Vis radiation cationically curable ink described herein (i.e. the ink containing exclusively cationically curable monomers and no radically curable monomers) is from about 1 wt-% to about 10 wt-%, preferably from about 1.1 wt-% to about 8 wt-%, more preferably from about 1.1 wt-% to about 6 wt-%, wherein the weight percent is based on the total weight of the UV-Vis radiation cationically curable ink. Preferably, the concentration of the one or more cationic photoinitiators in the UV-Vis radiation hybrid curable ink described herein (i.e. the ink containing both cationically curable monomers and radically curable monomers) is from 1 wt-% to about 6 wt-%, wherein the weight percent is based on the total weight of the UV-Vis radiation cationically curable ink.

The one or more cationic photoinitiators (also referred in the art as photo-acid generators) used in the UV-Vis radiation curable ink described herein are onium salts preferably selected from the group consisting of azanium salts, oxonium salts, iodonium salts, sulfonium salts and mixtures thereof, more preferably selected from the group consisting of oxonium salts, iodonium salts, sulfonium salts, and mixtures thereof, and even more preferably selected from the group consisting of sulfonium salts, iodonium salts, and mixtures thereof.

The one or more iodonium salts described herein have a cationic moiety and an anionic moiety, wherein the anionic moiety is preferably $BF_4^-$, $B(C_6F_5)_4^-$, $PF_6^-$, $AsF_6^-$, $SbF_6^-$ or $CF_3SO_3^-$, more preferably $SbF_6^-$ and wherein the cationic moiety is preferably an aromatic iodonium ion, more preferably a iodonium ion comprising two aryl groups, wherein the two aryl groups may be independently substituted by one or more alkyl groups (such as for example methyl, ethyl, isobutyl, tertbutyl, etc.), one or more alkoxy groups, one or more nitro groups, one or more halogen containing groups, one or more hydroxy groups or a combination thereof, preferably by one or more alkyl groups. Particularly suitable iodonium salts for the present invention are commercially available known under the name DEUTERON UV 1240, DEUTERON UV 1242, DEUTERON UV 2257, DEUTERON UV 1250, and DEUTERON UV 3100, all available from DEUTERON, OMNICAT 250, OMNICAT 440, and OMNICAT 445, all available from IGM Resins, SpeedCure 937, SpeedCure 938 and SpeedCure 939, all available from Lambson.

The one or more sulfonium salts described herein have a cationic moiety and an anionic moiety, wherein the anionic moiety is preferably $BF_4^-$, $B(C_6F_5)_4^-$, $PF_6^-$, $(PF_{6-h}(C_jF_{2j-1})_h)^-$ (where h is an integer from 1 to 5, and j is an integer from 1 to 4), $AsF_6^-$, $SbF_6^-$, $CF_3SO_3^-$, perfluoroalkyl sulfonate or pentafluorohydroxyantimonate, more preferably $SbF_6^-$ and wherein the cationic moiety is preferably an aromatic sulfonium ion, more preferably a sulfonium ion comprising two or more aryl groups, wherein the two or more aryl groups may be independently substituted by one or more alkyl groups (such as for example methyl, ethyl, isobutyl, tertbutyl, etc.) one or more alkoxy groups, one or more aryloxyl groups, one or more halogen containing groups, one or more hydroxy groups or a combination thereof. Suitable examples of sulfonium ions comprising two or more aryl groups include without limitation triarylsulfonium ions, diphenyl[4-(phenylthio)phenyl] sulfonium ion, bis[4-(diphenylsulfonio)phenyl]sulfonium ion, triphenylsulfonium ions and tris[4-(4-acetylphenyl)sulfanylphenyl] sulfonium ion. Particularly suitable examples of sulfonium salts for the present invention are commercially available under the name SpeedCure 976, SpeedCure 976D, and SpeedCure 992, all available from Lambson, ESACURE 1187, OMNICAT 270, OMNICAT 320, OMNICAT 432 and OMNICAT 550, all available from from IGM Resins.

The one or more oxonium salts described herein have a cationic moiety and an anionic moiety, wherein the anionic moiety is preferably $BF_4^-$, $B(C_6F_5)_4^-$, $PF_6^-$, $AsF_6^-$, $SbF_6^-$ or $CF_3SO_3^-$, more preferably $BF_4^-$ and wherein the cationic moiety is preferably an aromatic oxonium ion, more preferably a pyrylium ion preferably substituted by one or more aryl groups, wherein the one or more aryl groups may be independently of each other substituted by one or more alkyl groups (such as for example methyl, ethyl, isobutyl, tert-butyl, etc.), one or more alkoxy groups, one or more nitro groups, one or more halogen groups, one or more hydroxy groups or a combination thereof. A particularly suitable oxonium salt for the present invention is 2,4,6-triphenylpyrylium tetrafluoroborate.

Other examples of useful photoinitiators can be found in standard textbooks such as "Chemistry & Technology of UV & EB Formulation for Coatings, Inks & Paints", Volume I11, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

The one or more cationically curable monomers other than the cycloaliphatic epoxide described herein are selected from the group consisting of vinyl ethers, propenyl ethers, cyclic ethers such as as epoxides, oxetanes and tetrahydrofuranes, lactones, cyclic thioethers, vinyl thioethers, propenyl thioethers, hydroxyl-containing compounds and mixtures thereof, preferably selected from the group consisting of vinyl ethers and cyclic ethers such as as epoxides, oxetanes and tetrahydrofuranes, more preferably selected from the group consisting of vinyl ethers. Preferably, the ratio between the weight percent (wt-%) of the cycloaliphatic epoxide present in the ink described herein and the weight percent (wt-%) of the one or more cationically curable monomers other than the cycloaliphatic epoxide present in said ink is higher than about 1.1:1, the weight percent (wt-%) being based on the total weight of said ink.

Vinyl ethers are known in the art to accelerate curing and reduce tackiness, thus limiting the risk of blocking and set-off when the printed sheets are put in stacks just after printing and curing. They also improve the physical and chemical resistance of the printed security element and enhance the flexibility of the printed and cured ink layer and its adhesion to the substrate, which is particularly advantageous for printing on plastic and polymer substrates. Vinyl ethers also help reducing the viscosity of the ink while strongly co-polymerizing with the ink vehicle.

Examples of preferred vinyl ethers include methyl vinyl ether, ethyl vinyl ether, n-propyl vinyl ether, n-butyl vinyl ether, iso-butyl vinyl ether, ethylhexyl vinyl ether, octadecyl vinyl ether, dodecyl vinyl ether, isopropyl vinyl ether, tert-butyl vinyl ether, tert-amyl vinyl ether, cyclohexyl vinyl ether, cyclohexanedimethanol monovinyl ether, cyclohexanedimethanol divinyl ether, 4-(vinyloxy methyl)cyclohexylmethyl benzoate, phenyl vinyl ether, methylphenyl vinyl ether, methoxyphenyl vinyl ether, 2-chloroethyl vinyl ether, 2-hydroxyethyl vinyl ether, 4-hydroxybutyl vinyl ether, 1,6-hexanediol monovinyl ether, ethylene glycol divinyl ether, ethylene glycol monovinyl ether, 1,4-butanediol divinyl ether, 1,6-hexanediol divinyl ether, 4-(vinyloxy) butyl benzoate, bis[4-(vinyloxy)buty]adipate, bis[4-(vinyloxy)butyl]succinate, bis[4-(vinyloxymethyl)cyclohexylmethyl]glutarate, 4-(vinyloxy)butyl stearate, trimethylolpropane trivinyl ether, propenyl ether of propylene carbonate, diethylene glycol monovinyl ether, diethylene glycol divinyl ether, ethylene glycol butylvinyl ether, dipropylene glycol divinyl ether, triethylene glycol divinyl ether, triethylene glycol methyl vinyl ether, triethylene glycol monobutyl vinylether, tetraethylene glycol divinyl ether, poly(tetrahydrofuran) divinyl ether, polyethyleneglycol-520 methyl vinyl ether, pluriol-E200 divinyl ether, tris[4-(vinyloxy)butyl]trimellitate, 1,4-bis(2-vinyloxyethoxy)benzene, 2,2-bis(4-vinyloxyethoxyphenyl)propane, bis[4-(vinyloxy)methyl]cyclohexyl]methyl] terephthalate, bis[4-(vinyloxy) methyl]cyclohexyl]methyl] isophthalate. Suitable vinyl ethers are commercially sold by BASF under the designation EVE, IBVE, DDVE, ODVE, BDDVE, DVE-2, DVE-3, CHVE, CHDM-di, HBVE. The one or more vinyl ethers described herein may be hydroxy modified or (meth)acrylate modified (for example: VEEA, 2-(2-vinyloxyethoxy)ethyl acrylate from Nippon Shokubai (CAS: 88273-46-3)).

Oxetane compounds are known in the art to accelerate curing and reduce tackiness, thus limiting the risk of blocking and set-off when the printed sheets are put in stacks just after printing and curing. They also help reducing the viscosity of the ink while strongly co-polymerizing with the ink vehicle.

Preferred examples of oxetanes include trimethylene oxide, 3,3-dimethyloxetane, trimethylolpropane oxetane, 3-ethyl-3-hydroxymethyl oxetane, 3-ethyl-3-[(2-ethylhexyloxy) methyl]oxetane, 3,3-dicyclomethyl oxetane, 3-ethyl-3-phenoxymethyl oxetane, bis ([1-ethyl(3-oxetanyl)] methyl) ether, 1,4-bis [3-ethyl-3-oxetanyl methoxy)methyl] benzene, 3,3-dimethyl-2(p-methoxy-phenyl)-oxetane, 3-ethyl-[(tri-ethoxysilylpropoxy)methy]oxetane, 4,4-bis(3-ethyl-3-oxetanyl)methoxymethyl]biphenyl and 3,3-dimethyl-2(p-methoxy-phenyl) oxetane. The one or more oxetanes described herein may be hydroxy modified or (meth)acrylate modified (for example: UVi-Cure S170 from Lambson (CAS: 37674-57-0)).

Preferred examples of epoxide compounds include butanediol diglycidyl ether, butyl glycidyl ether, hexadecyl glycidyl ether, 2-ethyl-hexyl glycidyl ether, octyl glycidyl ether, decyl glycidyl ether, dodecyl glycidyl ether, tetradecyl glycidyl ether, and mixtures thereof.

The one or more radically curable monomers described herein are selected from the group consisting of mono(meth)acrylates, di(meth)acrylates, tri(meth)acrylates, tetra(meth)acrylates and mixtures thereof, preferably from the group consisting of tri(meth)acrylates, tetra(meth)acrylates and mixtures thereof. The term "(meth)acrylate" in the context of the present invention refers to the acrylate as well as the corresponding methacrylate.

Preferred examples of mono(meth)acrylates include 2(2-ethoxyethoxy)ethyl (meth)acrylate, 2-phenoxyethyl (meth)acrylate, $C_{12}$-$C_{14}$ alkyl (meth)acrylate, $C_{16}$-$C_{18}$ alkyl (meth)acrylate, caprolactone (meth)acrylate, cyclic trimethylolpropane formal (meth)acrylate, nonylphenol (meth)acrylate, isobornyl (meth)acrylate, isodecyl (meth)acrylate, lauryl (meth)acrylate, stearyl (meth)acrylate, octyldecyl (meth)acrylate, tridecyl (meth)acrylate, methoxy poly (ethyleneglycol) (meth)acrylate, polypropylene glycol (meth)acrylate, tetrahydrofurfuryl (meth)acrylate, 1,3-butylene glycol di(meth)acrylate, 1,4-butanediol di(meth)acrylate, 1,6-hexanediol di(meth)acrylate, 3-methyl-1,5-pentanedioldi(meth)acrylate, alkoxylated di(meth)acrylate, esterdiol di(meth)acrylate as well as mixtures thereof.

Preferred examples of di(meth)acrylates include bisphenol A di(meth)acrylates, alkoxylated (such as for example ethoxylated and propoxylated) bisphenol A di(meth)acrylate, bisphenol A diglycidyl ether di(meth)acrylate, ethylene glycol di(meth)acrylate, diethylene glycol di(meth)acrylate, triethylene glycol di(meth)acrylate, tetraethylene glycol di(meth)acrylate, dipropyleneglycol di(meth)acrylate, tripropylene glycol di(meth)acrylate, polyethylene glycol di(meth)acrylate, neopentyl glycol di(meth)acrylate, tricyclodecane dimethanol di(meth)acrylate, as well as mixtures thereof.

Preferred examples of tri(meth)acrylates include trimethylolpropane tri(meth)acrylates, alkoxylated (such as for example ethoxylated and propoxylated) trimethylolpropane tri(meth)acrylates, alkoxylated (such as for example ethoxylated and propoxylated) glycerol tri(meth)acrylates, pentaerythritol tri(meth)acrylates, alkoxylated pentaerythritol tri(meth)acrylates, alkoxylated (such as for example ethoxylated and propoxylated) pentaerythrtol tri(meth)acrylates, as well as mixtures thereof.

Preferred examples of tetra (meth)acrylates Include ditrimethylolpropane tetra(meth)acrylates, pentaerythritol tetra (meth)acrylates, alkoxylated (such as for example ethoxylated and propoxylated) pentaerythritol tetra(meth)acrylates and mixtures thereof, preferably selected from the group consisting of ditrimethylolpropane tetra(meth)acrylates, alkoxylated pentaerythritol tetra(meth)acrylates, as wel as mixtures thereof.

The radically curable (meth)acrylate oligomers described herein are preferably selected from the group consisting of epoxy (meth)acrylates, (meth)acrylated oils. (meth)acrylated epoxidized oils, polyester (meth)acrylates, aliphatic or aromatic polyurethane (meth)acrylates, polyacrylic acid (meth)acrylates, polyacrylate esters (meth)acrylates and mixtures thereof, more preferably selected from the group consisting of epoxy (meth)acrylates, polyester (meth)acrylates, aliphatic or aromatic polyurethane (meth)acrylates and mixtures thereof.

The radically curable oligomers described herein are preferably (meth)acrylate oligomers, which may be branched or essentially linear, and the (meth)acrylate functional group or groups, respectively, can be terminal groups and/or pendant side groups bonded to the oligomer backbone. Preferably, the radically curable oligomers are selected from the group consisting of (meth)acrylic oligomers, urethane (meth)acrylate oligomers, polyester (meth)acrylate oligomers, polyether based (meth)acrylate oligomers, epoxy (meth)acrylate oligomers and mixtures thereof, more preferably selected from the group consisting of polyester (meth)acrylate oligomers, epoxy (meth)acrylate oligomers and mixtures thereof.

Suitable examples of epoxy (meth)acrylate oligomers include without limitation aliphatic epoxy (meth)acrylate oligomers, in particular mono(meth)acrylates, di(meth)acrylates and tri(meth)acrylates, and aromatic epoxy (meth)acrylate oligomers. Suitable examples of aromatic epoxy (meth)acrylate oligomers include bisphenol-A (meth)acrylate oligomers such as bisphenol-A mono(meth)acrylates, bisphenol-A di(meth)acrylates and bisphenol-A tri(meth)acrylates as well as alkoxylated (such as for example ethoxylated and propoxylated) bisphenol-A (meth)acrylate oligomers such as for example alkoxylated bisphenol-A mono(meth)acrylates, alkoxylated bisphenol-A di(meth)acrylates and alkoxylated bisphenol-A tri(meth)acrylates, preferably alkoxylated bisphenol-A di(meth)acrylates.

The one or more free radical photoinitiators are preferably selected form the group consisting of hydroxyketones (e.g. alpha-hydroxyketones), alkoxyketones (e.g. alpha-alkoxyketones), acetophenones, benzophenones, ketosulfones, benzyl ketals, benzoin ethers, phosphine oxides, phenylglyoxylates, thioxanthones and mixtures thereof, more preferably selected form the group consisting of phosphine oxides, hydroxyketones, thioxanthones and mixtures thereof. Preferably, the concentration of the one or more free radical photoinitiators in the UV-Vis radiation hybrid curable ink described herein is from about 1 wt-% to about 6 wt-%, the percent being based on the total weight of the UV-Vis radiation hybrid curable ink.

Suitable alpha-hydroxyketones include without limitation (1-[4-(2-hydroxyethoxy)-phenyl]-2-hydroxy-2-methyl-1-propan-1-one), 1-hydroxycyclohexyl phenyl ketone, 2-hydroxy-2-methyl-1-phenylpropan-1-one, 2-hydroxy-2-methyl-1-(4-tert-butyl)phenylpropan-1-one, 2-hydroxy-1-[4-[[4-(2-hydroxy-2-methylpropanoyl)phenyl]methyl] phenyl]-2-methylpropan-1-one, 2-hydroxy-1-[4-[4-(2-hydroxy-2-methylpropanoyl)phenoxy]phenyl]-2-methylpropan-1-one, and oligo[2-hydroxy-2-methyl-1-[4-(1-methylvinyl)phenyl]propanone].

Suitable acetophenones include without limitation 2,2-diethoxyacetophenone, and 2-methoxy-2-phenylacetophenone.

Suitable benzophenones include without limitation benzophenone, polymeric benzophenone derivatives, 2-methylbenzophenone, 3-methylbenzophenone, 4-methylbenzophenone, 2,4,6-trimethylbenzophenone, 3,3'-dimethyl-4-methoxybenzophenone, 4-phenylbenzophenone, 4-chlorobenzophenone, methyl-2-benzoylbenzoate, 4-(4-methylphenylthio)benzophenone, 4-hydroxybenzophenone laurate, and a mixture of 50% benzophenone and 50% 1-hydroxycyclohexyl phenyl ketone.

Suitable ketosulfones include without limitation 1-[4-(4-benzoylphenylsulfanyl)phenyl]-2-methyl-2-(4-methylphenylsulfonyl)propan-1-one.

Suitable benzyl ketals include without limitation 2,2-dimethoxy-2-phenylacetophenone.

Suitable benzoin ethers include without limitation 2-ethoxy-1,2-diphenylethanone, 2-isopropoxy-1,2-diphenylethanone, 2-isobutoxy-1,2-diphenylethanone, 2-butoxy-1,2-diphenylethanone, 2,2-dimethoxy-1,2-diphenylethanone, and 2,2-diethoxyacetophenone.

Suitable phosphine oxides include without limitation 2,4,6-trimethylbenzoyldiphenylphosphine oxide, ethyl (2,4,6-trimethylbenzoyl)phenylphosphinate, phenylbis(2,4,6-trimethylbenzoyl)phosphine oxide, bis(2,6-dimethoxybenzoyl)-2,4,4-trimethylpentylphosphine oxide, substituted acylphosphine oxides, a mixture of diphenyl(2,4,6-trimethylbenzoyl)phosphine oxide and 2-hydroxy-2-methylpropiophenone, a mixture of phenylbis(2,4,6-trimethylbenzoyl)phosphine oxide and 2-hydroxy-2-methylpropiophenone, a mixture of ethyl(2,4,6-trimethylbenzoyl)phenylphosphinate and 2-hydroxy-2-methylpropiophenone, and a mixture of phenylbis(2,4,6-trimethylbenzoyl)phosphine oxide and ethyl (2,4,6-trimethylbenzoyl)phenylphosphinate.

Suitable thioxanthones include without limitation 2-methyl thioxanthone, 2,4-diethylthioxanthone, 2-isopropylthioxanthone, 1-chloro-4-propoxythioxanthone, and polymeric thioxanthone derivatives.

Suitable phenylglyoxylates include without limitation methyl benzoylformate, 2-[2-oxo-2-phenyl-acetoxy-ethoxy]ethyl 2-oxo-2-phenylacetate, and a mixture of 2-[2-oxo-2-phenyl-acetoxy-ethoxy]ethyl 2-oxo-2-phenylacetate and oxy-phenyl-acetic acid 2-[2-hydroxy-ethoxy]-ethyl ester.

Preferably, the one or more free radical photoinitiators are phosphine oxides as described herein, and more preferably a mixture of phenylbis(2,4,6-trimethylbenzoyl)phosphine oxide and ethyl (2,4,6-trimethylbenzoyl)phenylphosphinate.

The UV-Vis radiation curable ink described herein, specifically the UV-Vis radiation cationically curable ink described herein and the UV-Vis radiation hybrid curable ink described herein, comprises iv) a polyvinyl chloride copolymer containing at least about 69 wt-% of vinyl chloride. As shown for example by experiments E17-E20, E24-E27 according to the present invention and the comparative experiment C8, the UV-Vis radiation curable ink must contain a polyvinyl chloride copolymer containing at least about 69 wt-% of vinyl chloride, wherein the weight percent is based on the total weight of the UV-Vis radiation curable ink in order to provide via the manufacturing process claimed herein security features exhibiting a metallic yellow color upon viewing in incident light and blue color upon viewing in transmitted light. UV-Vis radiation curable inks containing no polyvinyl chloride copolymer (for e.g. Ink I25) provide security features with non-attractive colors, such as brown or dark brown, and low chroma value C* upon viewing in incident light and consequently, are not suitable to be used in the inventive manufacturing process claimed herein. It is within the common general knowledge of the person skilled in the art of inks formulation, taking into account the weight percents of the remaining components of the ink, in particular of the radically curable oligomer if present, and the printing process by which the inks to be formulated is printed to choose the adequate weight percentage of the polyvinyl chloride copolymer containing at least about 69 wt-% of vinyl chloride. The concentration of polyvinyl chloride copolymer in the UV-Vis radiation curable ink is preferably lower than about 15 wt-%, more preferably from about 2.9 wt-% to about 12 wt-%, even more preferably from about 4.9 wt-% to about 11.6 wt-%, and most preferably from about 6 wt-% to about 8.6 wt-%, wherein the weight percents are based on the total weight of the UV-Vis radiation curable ink.

The polyvinyl chloride copolymer must contain at least about 69 wt-%, preferably at least about 75 wt-% of vinyl chloride. Comparison of experiment C7 conducted for comparative reasons with experiments E21-E23 according to the present invention attests that the polyvinyl chloride copolymer must contain at least about 69 wt-%, preferably at least about 75 wt-% of vinyl chloride in order to provide via the manufacturing process claimed herein security features exhibiting a metallic yellow color upon viewing in Incident light.

In a preferred embodiment, the polyvinyl chloride copolymer is selected from the group consisting of vinyl chloride-vinyl acetate copolymer, and vinyl chloride-hydroxyacrylate copolymer, such as vinyl chloride-hydroxyalkylacrylate-Z-alkylenedioic acid, dialkyl ester copolymer, including vinyl chloride-2-hydroxypropylacrylate-2-butenedioic acid (Z)—, dibutyl ester copolymer. The polyvinyl chloride copolymer has preferably an average molecular weight of between $3*10^4$ g/mol and about $8*10^4$ g/mol as determined by size exclusion chromatography using polystyrene as standard and tetrahydrofuran as solvent. Particularly suitable examples of polyvinyl chloride copolymer for the present invention are commercially available under the name Vinnol® H14/36, Vinnol® E15/40A and Vinnol® E22/48A from Wacker.

Surprisingly, it has been found that the use of a perfluoropolyether functionalized with one or more functional groups selected from the group consisting of: hydroxyl, acrylate, and methacrylate, as surfactant in the UV-Vis radiation curable ink described herein is essential for producing security features exhibiting a metallic yellow color upon viewing in incident light. As attested for example by experiments E7 and E8 according to the present invention and experiments C2-C5 conducted for comparative reasons, only UV-Vis radiation curable inks containing a perfluoropolyether surfactant functionalized with one or more functional groups selected from the group consisting of: hydroxyl, acrylate, and methacrylate, provide security features exhibiting a metallic yellow color upon viewing in incident light. The security features produced as described in experiments C2-C5, by using an UV-Vis radiation curable ink comprising either a perfluoropolyether surfactant lacking a functional group selected from the group consisting of: hydroxyl, acrylate, and methacrylate (for e.g. inks I4 and I5 containing a perfluoropolyether anionic surfactant and a perfluoropolyether non-ionic surfactant, respectively), or a fluorosurfactant lacking the perfluoropolyether backbone in addition to the functional group selected from the group consisting of: hydroxyl, acrylate, and methacrylate (for e.g. inks I6 and I7 containing a fluoroalkyl non-ionic surfactant) show a brown to dark brown color in reflection, which is not eye-catching for the layperson, and therefore not suitable for a dichroic security feature for securing a value document.

The perfluoropolyether surfactant functionalized with one or more functional groups selected from the group consisting of: hydroxyl, acrylate, and methacrylate, comprises a perfluoropolyether backbone and one or more, preferably two or more, terminal functional groups selected from the group consisting of: hydroxyl, acrylate, and methacrylate and is characterized by an average molecular weight (Mn) below about 2000 [g/mol]. As used herein, a perfluoropolyether backbone denotes a residue of a perfluoropolyether polymer comprising randomly distributed recurring units selected from perfluoromethyleneoxy (—$CF_2O$—) and perfluoroethyleneoxy (—$CF_2$—$CF_2O$—). The perfluoropolyether residue is connected to the terminal functional group directly or via a spacer selected from methylene(oxyethylene), 1,1-difluoroethylene-(oxyethylene), methylene-di(oxyethylene), 1,1-difluoroethylene-di(oxyethylene), methylene-tri(oxyethylene), 1,1-difluoroethylene-tri(oxyethylene), methylene-tetra(oxyethylene), 1,1-difluoroethylene-tetra(oxyethylene), methylene-penta(oxyethylene), 1,1-difluoroethylene-penta(oxyethylene), and a linear or branched hydrocarbon group, optionally fluorinated at the carbon atom connecting the spacer to the perfluoropolyether residue, containing one or more urethane groups, and optionally one or more cyclic moieties, including saturated cyclic moieties (such as cyclohexylene) and aromatic cyclic moieties (such as phenylene). In a preferred embodiment, the perfluoropolyether surfactant is functionalized with one or more hydroxyl functional groups.

In a further preferred embodiment, the perfluoropolyether surfactant functionalized with one or more functional groups selected from the group consisting of: hydroxyl, acrylate, and methacrylate is a compound of general formula (VII) having an average molecular weight from about 1200 [g/mol] to about 2000 [g/mol]

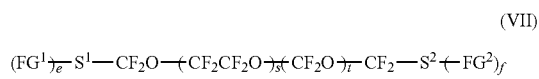
(VII)

wherein
f and e are independently of each other integers selected from 1, 2 and 3;
$FG^1$ and $FG^2$ are terminal functional groups selected independently of each other from the group consisting of: —OH, —OC(O)CH=$CH_2$, and —OC(O)C($CH_3$)=$CH_2$;
—$S^1$— represents a single bond or a spacer selected from:

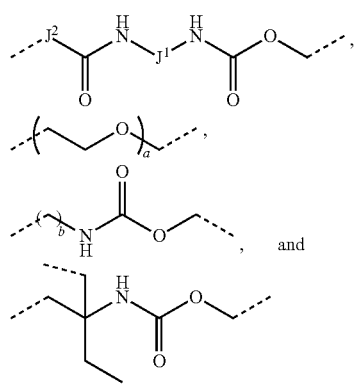

wherein
-$J^1$- is selected from

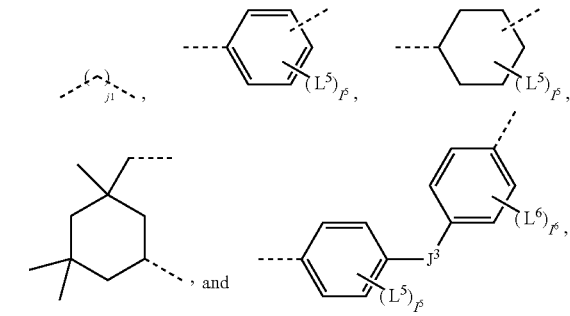

wherein
$j^1$ is an integer comprised between 1 and 12, preferably between 4 and 10;
$L^5$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);
$L^6$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);
$I^5$ and $I^6$ are independently of each other integers comprised between 0 and 4, preferably comprised between 0 and 1; and
-$J^3$- is selected from —O—, —$CH_2$—, —CH($CH_3$)—, and —C($CH_3$)$_2$—;
-$J^2$- is selected from

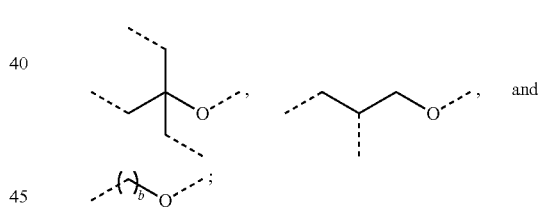

a is an integer comprised between 1 and 6, preferably between 1 and 3; and
b is an integer between 1 and 6, preferably between 2 and 4;
—$S^2$— represents a single bond or a spacer selected from

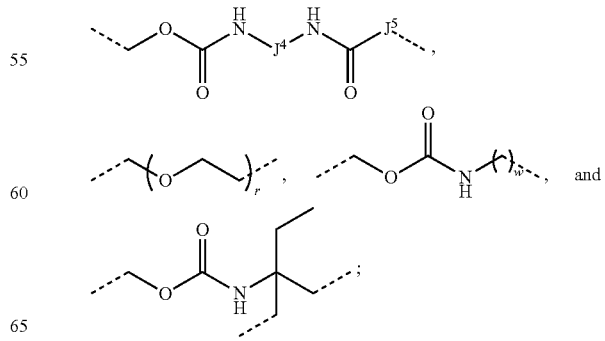

wherein
-J⁴- is selected from

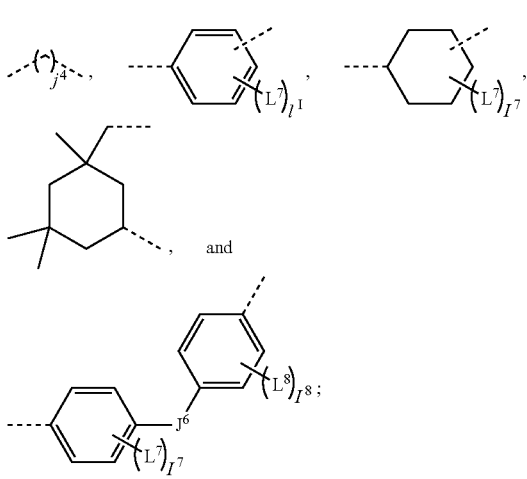

wherein
j⁴ is an integer comprised between 1 and 12, preferably between 4 and 10;
L⁷ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);
L⁸ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and I-propyl);
I⁷ and I⁸ are independently of each other integers comprised between 0 and 4, preferably comprised between 0 and 1; and
-J⁶- is selected from —O—, —CH₂—, —CH(CH₃)—, and —C(CH₃)₂—;
-J⁵- is selected from

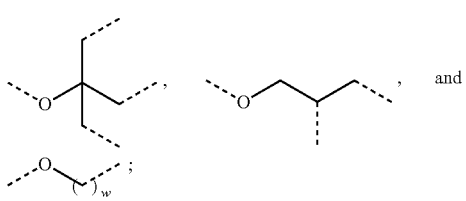

wherein r is an integer comprised between 1 and 6, preferably between 1 and 3; and
w is an integer between 1 and 6, preferably between 2 and 4;
and wherein s and t are integers chosen so that the average molecular weight of the compound of general formula (VII) is from about 1200 [g/mol] to about 2000 [g/mol].
Preferably, in general formula (VII), FG¹ and FG² represent independently of each other —OC(O)CH=CH₂, or —OC(O)C(CH₃)=CH₂;

—S¹— represents

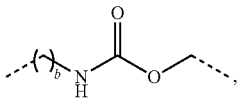

wherein b has the meaning defined herein; and
—S²— represents

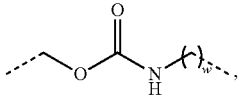

wherein w has the meaning defined herein.
Also preferably, in general formula (VII), FG¹ and FG² resent —OH;
—S¹— represents a single bond or

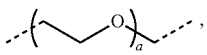

wherein a has the meaning defined herein; —S²— represents a single bond or

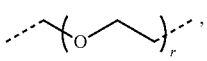

wherein r has the meaning defined herein;
and the sum of o and r is comprised between 3 and 9.
Particularly suitable examples of perfluoropolyether surfactant functionized with one or more functional groups selected from the group consisting of: hydroxyl, acrylate, and methacrylate for the present invention are commercially available under the name Fluorolink E10H, Fluorolink MD700, Fluorolink AD1700 and Fluorolink E-series from Solvay.
The concentration of the perfluoropolyether surfactant described herein in the UV-Vis radiation curable ink is preferably from about 0.05 wt-% to about 5 wt-%, preferably from about 0.075 wt-% to about 5 wt-%, more preferably from about 0.1 wt-% to about 2.5 wt-%, wherein the weight percents are based on the total weight of the UV-Vis radiation curable ink. As shown for example by experiments E9-E14 according to the present invention, a concentration of perfluoropolyether surfactant from about 0.05 wt-% to about 2.5 wt-%, preferably from about 0.075 wt-% to about 2.5 wt-%, and more preferably from about 0.1 wt-% to about 2.5 wt-% ensures the production of security features exhibiting a metallic yellow color in reflection with a high chroma value C*.
The UV-Vis radiation curable inks described herein may contain up to 25 wt-% of an organic solvent, the weight percent being based on the total weight of the UV-Vis radiation curable ink. The organic solvent has a boiling point higher than 100° C. Suitable organic solvents to be used in the UV-Vis radiation curable inks described herein include without limitation: ethyl-3-ethoxypropionate, 2-methoxy-1-methylethyl acetate, propylene glycol mono methyl ether, triethyleneglycol divinyl ether, cyclopentanone, cyclohexanone, n-butanol, cyclohexanol, ethylene carbonate, propylene carbonate, butylene carbonate, and mixtures thereof.

In a preferred embodiment according to the present invention, the UV-Vis radiation curable ink used in the inventive manufacturing process claimed and described herein is solvent-free. The use of a solvent-free ink in an industrial printing process of value documents is of high interest because it prevents emission of volatile organic components, which typically have a negative impact on the environment and are harmful for human health.

The UV-Vis radiation cationically curable ink described herein, as well as the UV-Vis radiation hybrid ink described herein may further comprise one or more photosensitizers in conjunction with the one or more photoinitiators described herein in order to achieve efficient curing. Suitable examples of photosensitizers are known to those skilled in the art (e.g. In Industrial Photoinitiators, W. A. Green, CRC Press, 2010, Table 8.1 p 0.170). Preferred photosensitizers are those that are able to achieve efficient and fast curing with UV-LED light sources, such as thioxanthone derivatives, anthracene derivatives and naphthalene derivatives (such as 9,10-diethoxyanthracene sold as Anthracure UVS-1101 and 9,10-dibutyloxyanthracene sold as Anthracure UVS-1331, both sold by Kawasaki Kasei Chemicals Ltd) and titanocene derivatives (such as Irgacure 784 sold by BASF). Particularly preferred are thioxanthone derivatives, including without limitation isopropyl-thioxanthone (ITX), 1-chloro-2-propoxy-thioxanthone (CPTX), 2-chloro-thioxanthone (CTX) and 2,4-diethyl-thioxanthone (DETX), and mixtures thereof. Alternatively, thioxanthone photosensitizers may be used in an oligomeric or polymeric form (such as Omnipol TX sold by IGM Resins, Genopol* TX-2 sold by Rahn, or Speedcure 7010 sold by Lambson). When present, the one or more photosensitizers are preferably present in an amount from about 0.1 wt-% to about 2 wt-%, more preferably from about 0.2 wt-% to about 1 wt-%, the weight percent being based on the total weight of the UV-Vis radiation curable ink.

The UV-Vis radiation curable ink described herein may further comprise one or more antifoaming agents in an amount of less than about 2 wt-%, preferably of less than about 1 wt-%.

To provide the value document with soil resistance and/or to protect the security feature against physical and chemical attacks from the environment, the manufacturing process claimed herein preferably further comprises steps f) and g) conducted after step c):

f) applying on the substrate, preferably by a printing process, a curable protective varnish to form a varnish layer;

g) curing the varnish layer obtained at step f) so as to form a protective coating.

Examples of suitable curable protective varnishes to be used at step f) and/or of methods of applying said curable protective varnishes on the substrate and of curing the varnish layer are described in the international patent application publication number WO2020234211A1, the international patent application publication number WO2013127715A2 and the international patent application publication number WO2014067715A1.

Preferably, the value document is selected from banknotes, deeds, tickets, checks, vouchers, fiscal stamps, agreements, identity documents such as passports, identity cards, visas, driving licenses, bank cards, credit cards, transactions cards, access documents, and cards, entrance tickets, public transportation tickets, academic diploma, and academic titles. More preferably the value document is a banknote. The process of producing security features claimed herein can be also used for producing a security feature directly on a value commercial good. The term "value commercial good" refers to packaging material, in particular for pharmaceutical, cosmetics, electronics or food industry that may be protected against counterfeiting and/or illegal reproduction in order to warrant the content of the packaging like for instance genuine drugs.

EXAMPLES

The present invention is now described in more details with reference to non-limiting examples. The experiments E1-E40 and comparative experiments C1-C8 below provide more details for the preparation of security features according to the process using the UV-Vis radiation curable screen printing security inks described herein.

A. Analytical Methods

A-1. UV-Vis Spectroscopy

UV-Vis spectra of dispersions were recorded on Varian Cary 50 UV-Visible spectrophotometer at such concentration of dispersions as to achieve the optical density of 0.3 to 1.5 at 1 cm optical path.

A-2. TEM Analysis

TEM analysis of dispersions and coatings was performed on EM 910 instrument from ZEISS in bright field mode at an e-beam acceleration voltage of 100 kV. At least 2 representative images with scale in different magnification were recorded in order to characterize the dominant particle morphology for each sample.

The diameter of the particles was determined from TEM images as maximum dimension of nanoplatelets, oriented parallel to the plane of the image, using Fiji image analysis software, based on the measurement of at least 300 randomly selected particles.

The thickness of the particles was measured manually as the maximum dimension of nanoplatelets, oriented perpendicular to the plane of the image, from a TEM image, based on the measurement of at least 50 randomly selected particles.

B. Preparation and Characterization of Ag Nanoplatelets

The silver nanoplatelets were prepared according to the procedure described by the international patent application publication number WO2020224982A1, which is detailed below.

B-1. Synthesis of Raw Material

In a 1 L double-wall glass reactor, equipped with anchor-stirrer, 365 g of de-ionized water was cooled to +2° C. 13.62 g of sodium borohydride was added, and the mixture was cooled to −1° C. with stirring at 250 rounds per minute (RPM, Solution A).

In a 0.5 L double-wall glass reactor, equipped with anchor-stirrer, 132 g of deionized water and 4.8 g of MPEG-5000-thiol were combined, and the mixture was stirred for 10 minutes at room temperature. 72 g of the product of Example A3 of WO2006074969 was added, and the resulting mixture was stirred for another 10 minutes at room temperature for homogenization. The solution of 30.6 g of silver nitrate in 30 g of de-ionized water was added in one portion and the mixture was stirred for 10 minutes, resulting in an orange-brown viscous solution. To this solution 96 g of deionized water was added, followed by addition of 3 g of Struktol SB2080 defoamer, pre-dispersed in 36 g of de-ionized water. The resulting mixture was cooled to 0° C. with stirring at 250 RPM (Solution B).

After that, Solution B was dosed with a peristaltic pump at a constant rate over 2 h into Solution A under the liquid surface via a cooled (0° C.) dosing tube, resulting in spherical silver nanoparticles dispersion. During pumping, the Solution A was stirred at 250 RPM.

After dosing was complete, the reaction mixture was warmed up to +5° C. within 15 minutes, and a solution of 882 mg of KCl in 10 g of deionized water was added in one portion, followed by addition of 9.6 g of ethylenediaminetetraacetic acid (EDTA) in 4 equal portions with 10 minutes time intervals. After addition of the last EDTA portion, the reaction mixture was stirred for 15 minutes at +5° C., then warmed up to 35° C. over 30 minutes and stirred for 1 h at this temperature. Upon this time, hydrogen evolution is completed.

3.0 mL of 30% w/w solution of ammonia in water was added, followed by addition of 5.76 g of solid NaOH, and the mixture was stirred for 15 min at 35° C. Then 180 mL of 50% w/w hydrogen peroxide solution in water were dosed with a peristaltic pump at a constant rate over 4 h into the reaction mixture under the liquid surface with stirring at 250 RPM, while maintaining the temperature at 35° C. This has led to a deep blue colored dispersion of silver nanoplatelets, which was cooled to room temperature. 1.23 g of compound of formula

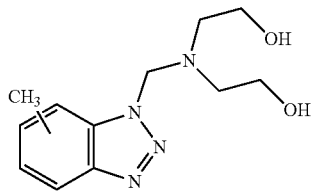

(mixture of CAS 80584-88-9 and 80584-89-0) was added, and the mixture was stirred for 1 h at room temperature.

B-2. Isolation and Purification of Ag Nanoplatelets

B-2a. First Decantation 9.6 g of sodium dodecylsulfate was added to the reaction mixture and then ca. 25 g of anhydrous sodium sulfate powder was added in portions with stirring until the transmission color of the dispersion changed from blue to pink. Then the mixture was kept without stirring at room temperature for 24 h, allowing the coagulated nanoplatelets to sediment at the bottom of the reactor.

890 g of supernatant was pumped out from the reactor with a peristaltic pump, and 890 g of deionized water was added to the reactor. The mixture in reactor was stirred for 1 h at room temperature, allowing the coagulated particles to re-disperse.

B-2b. Second Decantation

Ca. 64 g of anhydrous sodium sulfate powder was added in portions with stirring until the transmission color of the dispersion changed from blue to yellowish-pink. Then the mixture was kept without stirring at room temperature for 12 h, allowing the coagulated nanoplatelets to sediment at the bottom of the reactor. 990 g of supernatant was pumped out from the reactor with a peristaltic pump, and 90 g of deionized water was added to the reactor. The resulting mixture was stirred for 30 minutes at room temperature, allowing the coagulated particles to re-disperse.

B-2c. Ultrafiltration in Water

The resulting dispersion of Ag nanoplatelets was subjected to ultrafiltration using a Millipore Amicon 8400 stirred ultrafiltration cell. The dispersion was diluted to 400 g weight with de-ionized water and ultrafiltered to the end volume of ca. 50 mL using a polyethersulfone (PES) membrane with 300 kDa cut-off value. The procedure was repeated in total 4 times to provide 60 g of Ag nanoplatelets dispersion in water. After ultrafiltration was completed, 0.17 g of compound of formula

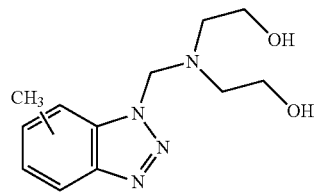

(mixture of CAS 80584-88-9 and 80584-89-0) was added to the dispersion.

Ag content 28.9 wt-%; yield ca. 89% based on total silver amount; solids content (at 250° C.) 33.5 wt-%; purity 86 wt-% of silver based on solids content at 250° C.

B-2d. Ultrafiltration in Isopropanol

The dispersion was further ultrafiltered in isopropanol. 60 g of Ag nanoplatelets dispersion, obtained after ultrafiltration in water, was placed in a Millipore Amicon 8400 stirred ultrafiltration cell and diluted to 300 g weight with isopropanol. The dispersion was ultrafiltered to the volume of ca. 50 mL using a polyethersulfone (PES) membrane with 500 kDa cut-off value. The procedure was repeated in total 4 times to provide 72 g of Ag nanoplatelets dispersion in isopropanol.

Ag content 24.1 wt-%; solids content (at 250° C.) 25.7 wt-%; purity 93.5 wt-% of silver based on solids content at 250° C.

The UV-Vis-NIR spectrum was recorded in water at Ag concentration of $9.8*10^{-5}$ M. $\lambda_{max}$=700 nm; extinction coefficient at maximum ε=10200 L/(cm*mol Ag), FWHM=340 nm.

The Ag nanoplatelets have a mean particle diameter of 93±40 nm and a mean particle thickness of 16±2.5 nm.

B-2e. Solvent Switch to Ethyl 3-Ethoxypropionate 30 g of Ag nanoplatelets dispersion after ultrafiltration in isopropanol was placed into 100 mL round-bottom flask and 9 g of ethyl 3-ethoxypropionate was added. The resulting mixture was concentrated on rotary evaporator at 40 mbar pressure and 40° C. bath temperature, till no more solvent was distilled off. The solids content was adjusted to 40% w/w by addition of ethyl 3-ethoxypropionate, yielding silver nanoplatelet dispersion D1.

B-2n. Solvent Switch to Uvacure 1500 (7-oxabicyclo[4.1.0] hept-3-ylmethyl 7-oxabicyclo[4.1.0]heptane-3-carboxylate)

30 g of Ag nanoplatelets dispersion after ultrafiltration in isopropanol was placed into 100 mL round-bottom flask and 6 g of Uvacure 1500 (Cytec) was added. The resulting mixture was concentrated on rotary evaporator at 40 mbar pressure and 40° C. bath temperature, till no more solvent was distilled off. The solids content was adjusted to 50% w/w by addition of Uvacure 1500, yielding silver nanoplatelet dispersion D2.

C. Preparation of Inks (I1-I33) and Printed Security Features Thereof

Description of the ingredients of the UV Vs radiation curable screen printing Inks (I1-I33)

TABLE 1

| Ingredient | Commercial name (supplier) | Chemical composition (CAS number) |
|---|---|---|
| Polyvinylchloride copolymer | Vinnol ® H14/36 (Wacker) | 85.6 wt-% PVC + 14.4 wt-% PVAc (9003-22-9) |
| Polyvinylchloride copolymer | Vinnol ® E15/40A (Wacker) | 84 wt-% PVC + 16 wt-% hydroxy acrylate (53710-52-4) |
| Polyvinylchloride copolymer | Vinnol ® E22/48A (Wacker) | 75 wt-% PVC + 25 wt-% hydroxy acrylate/dicarboxylic esters (114653-42-8) |
| Polyvinylchloride copolymer | Vinnol ® H40/50 (Wacker) | 63 wt-% PVC + 37 wt-% PVAc (9003-22-9) |
| Cycloaliphatic epoxide | Uvacure 1500 (Allnex) | 7-oxabicyclo[4.1.0]hept-3-ylmethyl 7-oxabicyclo[4.1.0]heptane-3-carboxylate (2386-87-0) |
| Vinylether | CHVE (BASF) | 1,4-bis[(vinyloxy)methyl]cyclohexane (17351-75-6) |
| Acrylate oligomer | Ebecryl 2959 | 23 wt-% Glycerol, propoxylated, esters with acrylic acid (52408-84-1) + 77 wt-% 4,4'-Isopropylidenediphenol, oligomeric reaction products with 1-chloro-2,3-epoxypropane, esters with acrylic acid (55818-57-0) |
| Acrylate monomer | TMPTA (Allnex) | 2,2-bis(acryloyloxymethyl)butyl acrylate (15625-89-5) |
| Anti-foaming agent | Tego Airex 900 (Evonik) | Siloxanes and Silicones, di-Me, reaction products with silica (CAS not provided) |
| Perfluoropolyether reactive surfactant | Fluorolink E10H (Solvay) | Tetrafluoroethylene, oxidized, oligomers, reduced, methyl esters, reduced, reaction products with ethylene oxide (162492-15-1) Average molecular weight 1700 [g/mol] |
| Perfluoropolyether reactive surfactant | Fluorolink MD700 (Solvay) | Perfluoropolyether urethane methacrylate (CAS not provided) Average molecular weight 1500 [g/mol] |
| Perfluoropolyether anionic surfactant | Fluorolink F10 (Solvay) | Perfluoropolyether functionalized with phosphate groups (200013-65-6) Average molecular weight 600-900 [g/mol] |
| Perfluoropolyether non-ionic surfactant | Fluorolink S10 (Solvay) | Perfluoropolyether functionalized with silane groups (223557-70-8) Average molecular weight 1750-1950 [g/mol] |
| Fluoroalkyl non-ionic surfactant | Dynasylan F-8815 (Evonik) | Fluoroalkyl functionalized with siloxane groups (CAS not provided) Average molecular weight not provided by the supplier |
| Fluoroalkyl non-ionic surfactant | Dynasyian F- 8261 (Evonik) | 1H,1H,2H,2H-Perfluorooctyltriethoxysilane (51851-37-7) |
| Cationic photoinitiator | Speedcure 976 (Lambson) | 50 wt-% mixture of Sulfonium, diphenyl[4-(phenylthio) phenyl]-, (OC-6-11)-hexafluoroantimonate(1-) (1:1) + Sulfonium, (thiodi-4,1-phenylene)bis[diphenyl-, (OC-6-11)-hexafluoroantimonate(1-) (1:2) (71449-78-0 and 89452-37-9) in 50% propylene carbonate (108-32-7) |
| Cationic photoinitiator | Speedcure 976D (Lambson) | 35 wt-% mixture of Sulfonium, diphenyl[4-(phenyithio)phenyl]-, (OC-6-11)-hexafluoroantimonate(1-) (1:1) + Sulfonium, (thiodi-4,1-phenylene)bis[diphenyl-, (OC-6-11)-hexafluoroantimonate(l-) (1:2) (71449-78-0 and 89452-37-9) in 65 wt-% Oxirane, 2,2'-[1,4-butanediylbis(oxymethylene)]bis- (2425-79-8) |
| Cationic photoinitiator | DEUTERON UV 1242 (Deuteron) | 50 wt-% bis(4-dodecylphenyl)iodonium hexafluoroantimonate (71786-70-4) + 50 wt-% oxirane, mono[(C12-14-alkyloxy)methyl] derivs. (68609-97-2) |
| Cationic-photoinitiator | 2,4,6-Triphenylpyrilium tetrafluoroborate (Sigma-Aldrich) | Pyrilium, 2,4,6-triphenyl-, tetrafluoroborate(1-) (448-61-3) |
| Radical photoinitiator | Omnirad 2100 (IGM Resins) | 92.5% ethyl phenyl(2,4,6-trimethylbenzoyl)phosphinate + 7.5 wt-% phenyl bis(2,4,6-trimethylbenzoyl)-phosphine oxide (448-61-3) |
| Sensitizer | Speedcure CPTX (Lambson) | 9H-Thioxanthen-9-one, 1-chloro-4-propoxy- (142770-42-1) |
| Ag nanoplatelets | Dispersion D1 | 40 wt-% in ethyl-3-ethoxypropionate (763-69-9) |
| Ag nanoplatelets | Dispersion D2 | 50 wt-% in Uvacure 1500 (2386-87-0) |

C1. Study of the influence of the Heating Temperature on the Optical Properties Exhibited by the Security Feature (Comparative Experiments C and Experiments E1-E6 and E31-E39)

C1a. Preparation of the Ink 1

To evaluate the influence of the heating temperature on the development of the metallic yellow color and of the blue color exhibited by the security feature in Incident and transmitted light, respectively, ink I1 was prepared as described below.

TABLE 2a

Composition of the UV-Vis radiation curable screen printing ink I1

| Ingredient | Commercial name | Amount wt-% |
|---|---|---|
| Polyvinylchloride copolymer | Vinnol ® H14/36 | 7.3 |
| Cycloaliphatic epoxide | Uvacure ® 1500 | 22 |
| Vinyl ether | CHVE | 16 |
| Radically curable oligomer | Ebecryl 2959 | 4.4 |
| Radically curable monomer | TMPTA | 9 |
| Perflucropolyether reactive surfactant | Fluorolink E10H | 1 |
| Cationic photoinitiator | Speedcure 976 | 5.8 |
| Free radical photoinitiator | Omnirad 2100 | 3.2 |
| Ag nanoplatelets | Dispersion D1 | 31.3 |
| Cationically curable monomers | | 38 |
| Radically curable monomers and oligomers | | 13.4 |
| Solvent | | 21.7 |
| Ag nanoplatelets (solid content) | | 12.5 |

Ingredients provided in Table 2a were mixed and dispersed at room temperature using a Dispermat CV-3 for 10 minutes at 2000 rpm so as to yield 50 g of ink I1. The silver nanoplatelets dispersion D1 contains 40 wt-% silver nanoplatelets and 60 wt-% ethyl-3-ethoxypropionate.

C1b. Preparation of Security Features

The UV-Vis radiation curable screen printing Ink I1 was independently applied on sixteen pieces of transparent polymer substrate (PET Hostaphan® RN, thickness 50 µm, supplied by Pütz GmbH+Co. Folien KG) using a 160 thread/cm screen (405 mesh). The printed pattern had a size of 5 cm×5 cm. After the printing step, the sixteen pieces of printed substrate were independently put on a heating plate (Huber PZ28-1) and heated during the time period indicated in Table 2b below at the temperatures indicated in Table 2b below, then cured by exposing them two times at a speed of 100 m/min to UV-Vis light under a dryer from IST Metz GmbH (two lamps: iron-doped mercury lamp 200 W/cm² + mercury lamp 200 W/cm²), to generate security features.

C1c. Results (Optical Properties) of Security Features

The optical properties of each security features obtained at item C1b were independently assessed in reflection, in transmission, and visually using the three tests described below. The results are summarized in Table 2b.

Reflection measurements were performed using a goniometer (Goniospektrometer Codec WI-10 5&5 by Phyma GmbH Austria). The L*a*b* values of the printed security features were determined at 0° to the normal with an illumination angle of 22.5° on the side of the transparent polymer substrate that was printed. The C* values (chroma, corresponding to a measure of the color intensity or color saturation) were calculated from a* and b* values according to the CIELAB (1976) color space, wherein:

$$C^* = 1(a^*)^2 + (b^*)^2$$

The C* values (reflection 22.5/0°) are displayed in Table 2b below.

Transmission measurements were carried out using a Datacolor 650 spectrophotometer (parameters: Integration sphere, diffuse illumination (pulse xenon D65) and 8° viewing, analyzer SP2000 with dual 256 diode array for wavelength range of 360-700 nm, transmission sampling aperture size of 22 mm). The C* values (transmission 8°) are displayed in Table 2b below.

A visual assessment was carried out observing each security feature with the naked eye in reflection with a diffuse source (such as the fight coming through a window without direct sun, the observer facing the wall opposite to the window). The following colors have been observed:

Dark brown to brown colors with matte appearance and no metallic effect;

Gold color (i.e. metallic yellow color) with glossy appearance and metallic effect. The metallic effect appears for a chroma value C* in reflection 22.5/0° higher than about 20.

A visual assessment was also carried out observing each security feature with the naked eye in transmission. The following colors have been observed:

Dull blue: the blue coloration is weak (but visible);

Blue (chroma value C* in transmission 8° higher than or equal to about 20) to deep blue (chroma value C* in transmission 8° higher than or equal to 30): the blue coloration is intense to very intense.

As shown in Table 2b, the security features obtained by a process according to the invention (experiments E1-E6 and E31-E39) exhibited gold color in reflection and blue to deep blue color in transmission, whereas a comparative security feature obtained by a process not according to the invention (experiment C1) exhibited a blue color in transmission, but a brown color with low chroma value in reflection, which is not eye-catching and not suitable for a dichroic security feature.

As attested for example by experiments E1-E6 and E31-E39 according to the present invention, security features with higher chroma values C* both in reflected light and in transmitted light can be obtained by increasing the heating temperature from about 55° C. to about 100° C. and/or of the heating time at step b) of the manufacturing process according to the present invention.

TABLE 2b

Color properties of security features obtained in the comparative experiment C1 and experiments E1-E6 and E31-E39 according to the present invention

| | C1 | E1 | E2 | E3 | E4 | E5 | E6 | E31 | E32 | E32 | E34 | E35 | E36 | E37 | E38 | E39 |
|---|---|---|---|---|---|---|---|---|---|---|---|---|---|---|---|---|
| Ink | I1 | | | | | | | | | | | | | | | |
| Temperature | 50° C. | 55° C. | 60° C. | 70° C. | 80° C. | 90° C. | 100° C. | | | | | 55° C. | | | | |
| Heating time | | | | 1 s | | | | 2 s | 3 s | 4 s | 5 s | 6 s | 7 s | 8 s | 9 s | 10 s |
| C* (reflection 22.5/0°) | 5 | 21 | 23 | 29 | 29 | 31 | 30 | 20 | 24 | 24 | 24 | 28 | 26 | 26 | 27 | 27 |

TABLE 2b-continued

Color properties of security features obtained in the comparative experiment
C1 and experiments E1-E6 and E31-E39 according to the present invention

| | C1 | E1 | E2 | E3 | E4 | E5 | E6 | E31 | E32 | E32 | E34 | E35 | E36 | E37 | E38 | E39 |
|---|---|---|---|---|---|---|---|---|---|---|---|---|---|---|---|---|
| C* (transmission 8°) | 23 | 30 | 30 | 33 | 31 | 36 | 39 | 31 | 33 | 33 | 32 | 35 | 34 | 31 | 33 | 34 |
| Color (reflection) | Brown | Gold | Gold | Gold | Gold | Gold | Gold | Gold | Gold | Gold | Gold | Gold | Gold | Gold | Gold | Gold |
| Color (transmission) | Blue | Blue | Deep blue | Deep blue | Deep blue | Deep blue | Deep blue | Deep blue | Deep blue | Deep blue | Deep blue | Deep blue | Deep blue | Deep blue | Deep blue | Deep blue |

C2. Study of the influence of the Surfactant on the Optical Properties Exhibited by the Security Feature (Comparative Experiments C2-C5 and Experiments E7-E8 According to the Present Invention)

To evaluate the influence of the surfactant on the optical properties exhibited by the security feature, inks I2-I7 were prepared.

C2a. Preparation of the Inks I2-I7

TABLE 3a

Composition of the UV-Vis radiation curable screen printing inks I2-I7

| | | Amount wt-% | | | | | |
|---|---|---|---|---|---|---|---|
| Ingredient | Commercial name | I2 | I3 | I4 | I5 | I6 | I7 |
| Polyvinylchloride copolymer | Vinnol ® H14/36 | | | 7.3 | | | |
| Cycloaliphatic epoxide | Uvacure ® 1500 | | | 19.7 | | | |
| Vinyl ether | CHVE | | | 16 | | | |
| Radically curable oligomer | Ebecryl 2959 | | | 4.4 | | | |
| Radically curable monomer | TMPTA | | | 9 | | | |
| Fluorosurfactant | Fluorolink E10H | 2.5 | | | | | |
| | Fluorolink MD700 | | 2.5 | | | | |
| | Fluorolink F10 | | | 2.5 | | | |
| | Fluorolink S10 | | | | 2.5 | | |
| | Dynasylan F-8815 | | | | | 2.5 | |
| | Dynasylan F-8261 | | | | | | 2.5 |
| Cationic photoinitiator | Speedcure 976 | | | 5.8 | | | |
| Free radical photoinitiator | Omnirad 2100 | | | 3.2 | | | |
| Antifoaming agent | Tego ® Airex 900 | | | 0.8 | | | |

TABLE 3a-continued

Composition of the UV-Vis radiation curable screen printing inks I2-I7

| | | Amount wt-% | | | | | |
|---|---|---|---|---|---|---|---|
| Ingredient | Commercial name | I2 | I3 | I4 | I5 | I6 | I7 |
| Ag nanoplatelets | D1 | | | 31.3 | | | |
| Cationically curable monomers | | | | 35.7 | | | |
| Radically curable monomers and oligomers | | | | 13.4 | | | |
| Solvent | | | | 21.7 | | | |
| Ag nanoplatelets (solid content) | | | | 12.5 | | | |

Ingredients provided in Table 3a were mixed and dispersed at room temperature using a Dispermat CV-3 for 10 minutes at 2000 rpm so as to yield 50 g of each ink I2-I7.

C2b. Preparation of Security Features

The UV-Vis radiation curable screen printing inks I2-17 were independently applied on six pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. Alter the printing step, the six pieces of printed substrate were independently put on a heating plate (Huber PZ28-1) and heated during 10 seconds at a 80° C. then cured by exposing them two times at a speed of 100 in/min to UV-Vis light under a dryer from IST Metz GmbH (two lamps: iron-doped mercury lamp 200 W/cm²+mercury lamp 200 W/cm²), to generate security features.

C2c. Results (Optical Properties) of Security Features

The optical properties of the security features obtained in the comparative experiments C2-C5 and experiments E7-E8 according to the present invention were Independently assessed in reflection, in transmission, and visually using the tests described at item C1c.

The colors in reflection and transmission and the C* values (reflection 22.5/0° and transmission 8°) exhibited by the security features prepared in the comparative experiments C2-C5 and experiments E7-E8 according to the present invention are displayed in Table 3b below.

TABLE 3b

Color properties of security features obtained in comparative experiments C2-C5 and experiments E7-E8.

| | C2 | C3 | C4 | C5 | E7 | E8 |
|---|---|---|---|---|---|---|
| Ink | I4 | I5 | I6 | I7 | I2 | I3 |
| Fluorosurfactant | Fluorolink F10 | Fluorolink S10 | Dynasylan F-8815 | Dynasylan F-8261 | Fluorolink E10H | Fluorolink MD700 |
| C* (reflection 22.5/0°) | 6 | 15 | 7 | 14 | 23 | 26 |
| C* (transmission 8°) | 24 | 28 | 27 | 28 | 26 | 27 |

TABLE 3b-continued

Color properties of security features obtained in comparative experiments C2-C5 and experiments E7-E8.

|  | C2 | C3 | C4 | C5 | E7 | E8 |
|---|---|---|---|---|---|---|
| Color (reflection) | Dark brown | Brown | Dark brown | Brown | Gold | Gold |
| Color (transmission) | Blue | Blue | Blue | Blue | Blue | Blue |

As shown in Table 3b, the security features obtained in experiments E7 and E8 according to the present invention using an Ink comprising a perfluoropolyether surfactant functionalized with hydroxyl groups or methacrylate groups (Fluorolink E10H/I2 and Fluorolink MD700/I3) exhibited gold color in reflection and blue color in transmission. By comparison, the security features obtained by using an Ink comprising a perfluoropolyether anionic surfactant (Fluorolink F10/I4), a perfluoropolyether non-ionic surfactant (Fluorolink S10/I5) or a fluorosurfactant lacking a perfluoropolyether backbone, as well as a functional group selected from hydroxyl groups, acrylate groups and methacrylate groups (Dynasylan F8815/I6 and Dynasylan F8261/I7) exhibited a blue color in transmission, but a dark brown to brown color with low chroma value in reflection. A dark brown to brown color with low chroma value in reflection is not eye-catching and therefore, not suitable for a dichroic security feature for securing a value document.

C3. Study of the Influence of the Perfluoropolyether Surfactant Concentration on the Optical Properties Exhibited by the Security Feature (Comparative Experiment C6 and Experiments E9-E14 According to the Present Invention)

To evaluate the Influence of the of the concentration of perfluoropolyether surfactant functionalized with one or more functional groups selected from the group consisting of: hydroxyl, acrylate, and methacrylate on the optical properties exhibited by the security feature, inks I8-I14 were prepared as described below.

C3a. Preparation of the Ink I8-I14

TABLE 4a

Composition of the UV-Vis radiation curable screen printing inks I8-I14.

| Ingredient | Commercial name | I8 | I9 | I10 | I11 | I12 | I13 | I14 |
|---|---|---|---|---|---|---|---|---|
| Polyvinylchloride copolymer | Vinnol ® H14/36 |  |  |  | 7.3 |  |  |  |
| Cycloaliphatic epoxide | Uvacure ® 1500 | 23 | 22.9 | 22.7 | 22.5 | 22.2 | 22 | 20.5 |
| Vinyl ether | CHVE |  |  |  | 16 |  |  |  |
| Radically curable oligomer | Ebecryl 2959 |  |  |  | 4.4 |  |  |  |
| Radically curable monomer | TMPTA |  |  |  | 9 |  |  |  |
| Perfluoropolyether reactive surfactant | Fluorolink E10H | 0 | 0.1 | 0.3 | 0.5 | 0.8 | 1 | 2.5 |
| Cationic photoinitiator | Speedcure 976 |  |  |  | 5.8 |  |  |  |
| Free radical photoinitiator | Omnirad 2100 |  |  |  | 3.2 |  |  |  |
| Ag nanoplatelets | D1 |  |  |  | 31.3 |  |  |  |
| Cationically curable monomers |  | 39 | 38.9 | 38.7 | 38.5 | 38.2 | 38 | 36.5 |
| Radically curable monomers and oligomers |  |  |  |  | 13.4 |  |  |  |
| Solvent |  |  |  |  | 21.7 |  |  |  |
| Ag nanoplatelets (solid content) |  |  |  |  | 12.5 |  |  |  |

Ingredients provided in Table 4a were mixed and dispersed at room temperature using a Dispermat CV-3 for 10 minutes at 2000 rpm so as to yield 50 g of each ink I8-I14.

C3b. Preparation of Security Features

The UV-Vis radiation curable screen printing inks I8-I14 were Independently applied on seven pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. After the printing step, the seven pieces of printed substrate were independently put on a heating plate (Huber PZ28-1) and heated during 10 seconds at a 80° C., then cured by exposing them two times at a speed of 100 m/min to UV-Vis light under a dryer from IST Metz GmbH (two lamps: iron-doped mercury lamp 200 W/cm$^2$+mercury lamp 200 W/cm$^2$), to generate security features.

C3c. Results (Optical Properties) of Security Features

The optical properties of the security features obtained in the comparative experiment C6 and experiments E9-E14 according to the present invention were independently assessed in reflection, in transmission, and visually using the tests described at item C1c.

The colors in reflection and transmission and the chroma values C* (reflection 22.5/0° and transmission 8°) exhibited by the security features prepared in the comparative experiment C6 and experiments E9-E14 according to the present invention are displayed in Table 4b below.

TABLE 4b

Color properties of security features obtained in the comparative experiment C6 and experiments E9-E14 according to the present invention.

|  | C6 | E9 | E10 | E11 | E12 | E13 | E14 |
|---|---|---|---|---|---|---|---|
| Ink | I8 | I9 | I10 | I11 | I12 | I13 | I14 |
| Amount of surfactant | 0 | 0.1 | 0.3 | 0.5 | 0.8 | 1 | 2.5 |
| C* (reflection 22.5/0°) | 12 | 34 | 36 | 32 | 37 | 38 | 35 |
| C* (transmission 8°) | 25 | 24 | 27 | 26 | 30 | 26 | 27 |
| Color (reflection) | Brown | Gold | Gold | Gold | Gold | Gold | Gold |
| Color (transmission) | Blue | Blue | Blue | Blue | Deep blue | Blue | Blue |

As shown in Table 4b, the use of a concentration of perfluoropolyether surfactant Fluorolink E10H from about 0.1 wt-% to about 2.5 wt-% ensures that security features exhibiting metallic yellow color with high chroma values in reflection and blue to deep blue color in transmission are obtained with the present manufacturing process. By comparison, the security feature obtained in the comparative experiment C6 with an ink containing no Fluorolink E10H shows a dark brown to brown color with low chroma value in reflection. Such color is not eye-catching for the layperson and cannot be used as security feature for securing a value document.

C4. Study of the Effect of the Solvent (Solvent-Containing Versus Solvent-Free Ink) and/or of the Weight Percent of the Radically Curable Monomers and Oligomers Present in the UV-Vis Radiation Curable Ink (UV-Vis Radiation Hybrid Curable Ink Versus UV-Vis Radiation Cationically Curable Ink) on the Optical Properties Obtained Exhibited by the Security Feature (Experiments E15-E56 and E40 According to the Present Invention)

To assess whether the optical effects obtained by using a solvent-containing UV-Vis radiation hybrid curable ink can be reproduced with a solvent-free UV-Vis radiation hybrid curable ink and a solvent-free UV-Vis radiation cationically curable ink, inks I1, I15 and I16 were prepared.

C4a. Preparation of the Inks I15 and I16

TABLE 5a

Composition of the UV-Vis radiation curable screen printing inks I15-I16

| | | Amount wt-% | |
|---|---|---|---|
| Ingredient | Commercial name | I15 | I16 |
| Polyvinylchloride copolymer | Vinnol ® H14/36 | 7.3 | |
| Cycloaliphatic epoxide | Uvacure ® 1500 | 36.9 | 23.5 |
| Vinyl ether | CHVE | 16 | |
| Radically curable oligomer | Ebecryl 2959 | 0 | 4.4 |
| Radically curable monomer | TMPTA | 0 | 9 |
| Perfluoropolyether reactive surfactant | Fluorolink E10H | 2.5 | |
| Cationic photoinitiator | Speedcure 976D | 11.5 | 8.3 |
| Free radical photoinitiator | Omnirad 2100 | 0 | 3.2 |
| Antifoaming agent | Tego ® Airex 900 | 0.8 | |
| Ag nanoplatelets | D2 | 25 | |
| Cationically curable monomers | | 72.9 | 57.4 |
| Radically curable monomers and oligomers | | 0 | 13.4 |
| Solvent | | 0 | 0 |
| Ag nanoplatelets (solid content) | | 12.5 | 12.5 |

Ingredients provided in Table 5a were mixed and dispersed at room temperature using a Dispermat CV-3 for 10 minutes at 2000 rpm so as to yield 50 g of each ink I15 and I16. I15 is a solvent-free UV-Vis radiation cationically curable ink, whereas I16 is a solvent-free UV-Vis radiation hybrid curable Ink.

Ink I1 prepared at Item C1a is a solvent-containing UV-Vis radiation hybrid curable Ink. The silver nanoplatelets dispersion D2 contains 50 wt-% silver nanoplatelets and 50 wt-% Uvacure 1500 (cycloaliphatic epoxide).

C4b. Preparation of Security Features

The UV-Vis radiation curable screen printing Ink I1, I15 and I16 were independently applied on three pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. After the printing step, the three pieces of printed substrate were independently put on a heating plate (Huber PZ28-1) and heated during 10 seconds at 80° C., then cured by exposing them two times at a speed of 100 m/min to UV-Vis light under a dryer from IST Metz GmbH (two lamps: iron-doped mercury lamp 200 W/cm$^2$+mercury lamp 200 W/cm$^2$, to generate security features.

C$_4$c. Results (Optical Properties) of Security Features

The optical properties of the security features obtained in the experiments E15. E16 and E40 according to the present invention were Independently assessed in reflection, in transmission, and visually using the tests described at item C1c.

The colors in reflection and transmission and the chroma values C* (reflection 22.5/0° and transmission 8°) exhibited by the security features are displayed in Table 5b below.

TABLE 5b

Color properties of security features obtained in the experiments E15, E16 and E40 according to the present invention.

|  | E15 | E16 | E40 |
|---|---|---|---|
|  |  | Ink |  |
|  | I15 Solvent-free cationic ink | I16 Solvent-free hybrid ink | I1 Solvent-containing hybrid ink |
| C* (reflection 22.5/0°) | 24 | 27 | 23 |
| C* (transmission 8°) | 25 | 34 | 26 |
| Color (reflection) | Gold | Gold | Gold |
| Color (transmission) | Blue | Deep blue | Blue |

As shown in Table 5b, the use of a solvent-containing hybrid ink (I1), a solvent-free hybrid ink (I16) or a solvent-free cationic ink (I15) in the manufacturing process does not influence the optical properties of the security feature.

C5. Study of the Influence of the Ratio Between the Weight Percent of the Radically Curable Monomers and Oligomers Present in the Ink and the Weight Percent of the Cationically Curable Monomers Present in the Ink on the Optical Properties of the Security Features (Experiments E17-E20 According to the Present Invention)

C5a. Preparation of the Inks I17-I20

TABLE 6a

Composition of the UV-Vis radiation curable screen printing inks I17-I20

|  |  | Amount wt-% | | | |
|---|---|---|---|---|---|
| Ingredient | Commercial name | I17 | I18 | I19 | I20 |
| Polyvinylchloride copolymer | Vinnol ® H14/36 | 7.3 | 5.8 | 3.6 | 2.9 |
| Cycloaliphatic epoxide | Uvacure ® 1500 | 33.8 | 26.6 | 16.7 | 13.4 |
| Vinyl ether | CHVE | 16 | 12.7 | 7.9 | 6.3 |
| Radically curable oligomer | Ebecryl 2959 | 0 | 3.7 | 9.3 | 11.1 |
| Radically curable monomer | TMPTA | 0 | 7.6 | 18.9 | 22.7 |
| Perfluoropolyether reactive surfactant | Fluorolink E10H | | | 2.5 | |
| Cationic photoinitiator | Speedcure 976D | 8.3 | 7 | 4.2 | 3.3 |
| Free radical photoinitiator | Omnirad 2100 | 0 | 2 | 4.8 | 5.7 |
| Antifoaming agent | Tego ® Airex 900 | | | 0.8 | |
| Ag nanoplatelets | D1 | | | 31.3 | |
| Cationically curable monomers | | 55.2 | 43.9 | 27.3 | 22.1 |
| Radically curable monomers and oligomers | | 0 | 11.3 | 28.2 | 33.8 |
| Ratio between the wt-% of radically curable mono- and oligomers, and wt-% of cationically curable monomers | | 0% | 0.26:1 | 1.03:1 | 1.53:1 |
| Solvent | | | | 18.8 | |
| Ag nanoplatelets (solid content) | | | | 12.5 | |

Ingredients provided in Table Ba were mixed and dispersed at room temperature using a Dispermat CV-3 for 10 minutes at 2000 rpm so as to yield 50 g of each ink I17-I20.

C5b. Preparation of Security Features

The UV-Vis radiation curable screen printing ink I17-I20 were Independently applied on four pieces of transparent polymer substrate (PET Hostaphan® RN, thickness 50 µm, supplied by Pütz GmbH+Co. Folien KG) using a 160 thread/cm screen (405 mesh). The printed pattern had a size of 5 cm×5 cm. After the printing step, the four pieces of printed substrate were Independently put on a heating plate (Huber PZ28-1) and heated during 10 seconds at 80° C., then cured by exposing them two times at a speed of 100 m/min to UV-Vis light under a dryer from IST Metz GmbH (two lamps: iron-doped mercury lamp 200 W/cm²+mercury lamp 200 W/cm², to generate security features.

C5c. Results (Optical Properties) of Security Features

The optical properties of the security features obtained in the experiments E17-E20 according to the present invention were independently assessed in reflection, in transmission, and visually using the tests described at item C1c.

The colors in reflection and transmission and the chroma values C* (reflection 22.5/0° and transmission 8°) exhibited by the security features are displayed in Table 6b below.

TABLE 6b

Color properties of security features obtained in the experiments E17-E20 according to the present invention.

|  | E17 | E18 | E19 | E20 |
|---|---|---|---|---|
|  |  | Ink | | |
|  | I17 | I18 | I19 | I20 |
| Ratio between the wt-% of radically curable mono- and oligomers, and the wt-% of cationically curable monomers | 0 | 0.26:1 | 1.03:1 | 1.53:1 |
| C* (reflection 22.5/0°) | 27 | 25 | 30 | 23 |
| C* (transmission 8°) | 32 | 39 | 38 | 43 |
| Color (reflection) | Gold | Gold | Gold | Gold |
| Color (transmission) | Deep blue | Deep blue | Deep blue | Deep blue |

Experiments E17-E20 according to the present invention show that similar optical effects can be obtained by using a UV-Vis radiation cationically curable ink (I17) or a UV-Vis radiation hybrid curable ink (I18-I120) having a ratio between the weight percent (wt-%) of radically curable mono- and oligomers, and the weight percent (wt-%) of cationically curable monomers lower than about 1.53:1.

C6. Study of the Influence of the Type of Polyvinylchloride Copolymer on the Optical Properties Exhibited by the Security Feature (Comparative Experiment C7 and Experiments E21-E23 According to the Present Invention)

To assess the influence of the type of polyvinylchloride copolymer on the optical properties exhibited by the security feature, inks I21-I24 containing a different polyvinyl chloride were prepared as described below.

C6a. Preparation of the Inks I21-I24

TABLE 7a

Composition of the UV-Vis radiation curable screen printing inks I21-I24

| | | Amount wt-% | | | |
|---|---|---|---|---|---|
| Ingredient | Commercial name | I21 | I22 | I23 | I24 |
| Polyvinylchloride copolymer | Vinnol ® H14/36[a] | 7.3 | | | |
| | Vinnol ® E15/40A[b] | | 7.3 | | |
| | Vinnol ® E22/48A[c] | | | 7.3 | |
| | Vinnol ® H40/50[d] | | | | 7.3 |
| Cycloaliphatic epoxide | Uvacure ® 1500 | | | | 35.7 |
| Radically curable oligomer | Ebecryl 2959 | | | | 4.4 |
| Radically curable monomer | TMPTA | | | | 9 |
| Perfluoropolyether reactive surfactant | Fluorolink E10H | | | | 2.5 |
| Cationic photoinitiator | Speedcure 976 | | | | 5.8 |
| Free radical photoinitiator | Omnirad 2100 | | | | 3.2 |
| Antifoaming agent | Tego ® Airex 900 | | | | 0.8 |
| Ag nanoplatelets | D1 | | | | 31.3 |
| Cationically curable monomers | | | | | 35.7 |
| Radically curable monomers and oligomers | | | | | 13.4 |
| Percentage of PVC in polyvinylchloride copolymer [wt-%] | | 85.6 | 84 | 75 | 63 |
| Solvent | | | | | 21.7 |
| Ag nanoplatelets (solid content) | | | | | 12.5 |

[a] polyvinylchloride/polyvinylacetate resin (85.6%/1 4.4%), K value 35 ± 1, molecular mass 3-4 · $10^4$ Dalton (Wacker, size-exclusion chromatography)
[b] polyvinylchloride/polyhydroxyacrylate resin (84%/16%), K value 39 ± 1, molecular mass 4-5 · $10^4$ Dalton (Wacker, size-exclusion chromatography)
[c] polyvinylchloride/(acrylic acid/1,2-propanediol/butenedioic acid dibutyl ester copolymer) (75%/25%), K value 48 ± 1, molecular mass 6-8 · $10^4$ Dalton (Wacker, size-exclusion chromatography)
[d] polyvinylchloride/polyvinylacetate resin (63%/37%), K value 50 ± 1, molecular mass 6-8 · $10^4$ Dalton (Wacker, size-exclusion chromatography)

Ingredients provided in Table 7a were mixed and dispersed at room temperature using a Dispermat CV-3 for 10 minutes at 2000 rpm so as to yield 50 g or each Ink I21-I24.

C6b. Preparation of Security Features

The UV-Vis radiation curable screen printing ink I21-I24 were independently applied on four pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. After the printing step, the four pieces of printed substrate were independently put on a heating plate (Huber PZ28-1) and heated during 10 seconds at 80° C., then cured by exposing them two times at a speed of 100 m/min to UV-Vis light under a dryer from IST Metz GmbH (two lamps: iron-doped mercury lamp 200 W/cm²+mercury lamp 200 W/cm², to generate security features.

C6c. Results (Optical Properties) of Security Features

The optical properties of the security features obtained in the comparative experiment C7 and the experiments E21-E23 according to the present invention were independently assessed in reflection, in transmission, and visually using the tests described at Item C1c.

The colors in reflection and transmission and the chroma values C* (reflection 22.5/0° and transmission 8°) exhibited by the security features are displayed in Table 7b below.

TABLE 7b

Color properties of security features obtained in the comparative experiment C7 and the experiments E21-E23 according to the present invention.

| | C7 | E21 | E22 | E23 |
|---|---|---|---|---|
| | | Ink | | |
| | I24 | I21 | I22 | I23 |
| Percentage of PVC in polyvinylchloride copolymer [ wt-%] | 63 | 85.6 | 84 | 75 |
| C* (reflection 22.5/0°) | 16 | 31 | 30 | 28 |
| C* (transmission 8°) | 20 | 35 | 43 | 32 |
| Color (reflection) | Brown | Gold | Gold | Gold |
| Color (transmission) | Dull blue | Deep blue | Deep blue | Deep blue |

As shown in Table 7b, the polyvinyl chloride copolymer must contain at least about 69 wt-%, preferably at least about 75 wt-% of vinyl chloride to provide a security feature exhibiting a metallic yellow color in reflection. The security feature obtained in comparative experiment C7 made with an ink containing a polyvinyl chloride copolymer with a lower wt-% of vinyl chloride shows a brown color in reflected light, which is not eye-catching for the layperson and cannot be used as security feature for securing a value document.

C7. Study of the Influence of the Polyvinylchloride Copolymer Concentration on the Optical Properties of the Security Feature (Comparative Experiment C8 and Experiments E24-E27 According to the Present Invention)

C7a. Preparation of the Inks I25, I27-I30

TABLE 8a

Composition of the UV-Vis radiation curable screen printing inks I25, I27-I30

| Ingredient | Commercial name | Amount wt-% | | | | |
|---|---|---|---|---|---|---|
| | | I25 | I27 | I28 | I29 | I30 |
| Polyvinylchloride copolymer | Vinnol ® H14/36 | 0 | 4.9 | 7.3 | 8.6 | 11.6 |
| Cycloaliphatic epoxide | Uvacure ® 1500 | 27 | 22.1 | 19.7 | 23.4 | 31.4 |
| Vinyl ether | CHVE | 16 | 16 | 16 | 11 | 0 |
| Radically curable oligomer | Ebecryl 2959 | | | 4.4 | | |
| Radically curable monomer | TMPTA | | | 9 | | |
| Perfluoropolyether reactive surfactant | Fluorolink E10H | | | 2.5 | | |
| Cationic photoinitiator | Speedcure 976 | | | 5.8 | | |
| Free radical photoinitiator | Omnirad 2100 | | | 3.2 | | |
| Antifoaming agent | Tego ® Airex 900 | | | 0.8 | | |
| Ag nanoplatelets | D1 | | | 31.3 | | |
| Viscosity of the inks [mPas] $^{a)}$ T = 25° C. | | 20 | 96 | 171 | 282 | 982 |
| Cationically curable monomers | | 43 | 38.1 | 35.7 | 34.4 | 31.4 |
| Radically curable monomers and oligomers | | | | 13.4 | | |
| Solvent | | | | 21.7 | | |
| Ag nanoplatelets (solid content) | | | | 12.5 | | |

$^{a)}$ Viscosity was determined using a Brookfield viscosimeter (model "DVI-Prime") equipped with a spindle S21 at 100 rpm (I25, I27-I29) or a spindle S21 at 50 rpm (I30).

Ingredients provided in Table 8a were mixed and dispersed at room temperature using a Dispermat CV-3 for 10 minutes at 2000 rpm so as to yield 50 g of each ink I25, I27-I30.

C6b. Preparation of Security Features

The UV-Vis radiation curable screen printing ink I25, I27-I30 were independently applied on five pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. After the printing step, the five pieces of printed substrate were independently put on a heating plate (Huber PZ28-1) and heated during 10 seconds at 80° C., then cured by exposing them two times at a speed of 100 m/min to UV-Vis light under a dryer from IST Metz GmbH (two lamps: iron-doped mercury lamp 200 W/cm$^2$+mercury lamp 200 W/cm$^2$, to generate security features.

C7c. Results (Optical Properties) of Security Features

The optical properties of the security features obtained in the comparative experiment C8 and the experiments E24-E27 according to the present Invention were independently assessed in reflection, in transmission, and visually using the tests described at item C1c.

The color in reflection and transmission and the chroma values C* (reflection 22.5/0° and transmission 8°) exhibited by the security features are displayed in Table 8b below.

TABLE 8b

Color properties of security features obtained in the comparative experiment C8 and the experiments E24-E27 according to the present invention.

| | C8 | E24 | E25 | E26 | E27 |
|---|---|---|---|---|---|
| | | | Ink | | |
| | I25 | I27 | I28 | I29 | I30 |
| Amount of polyvinylchloride copolymer | 0 | 4.9 | 7.3 | 8.6 | 11.6 |
| C* (reflection 22.5/0°) | 3 | 21 | 25 | 27 | 23 |
| C* (transmission 8°) | 32 | 23 | 28 | 32 | 28 |

TABLE 8b-continued

Color properties of security features obtained in the comparative experiment C8 and the experiments E24-E27 according to the present invention.

| | C8 | E24 | E25 | E26 | E27 |
|---|---|---|---|---|---|
| | | | Ink | | |
| | I25 | I27 | I28 | I29 | I30 |
| Color (reflection) | Dark brown | Gold | Gold | Gold | Gold |
| Color (transmission) | Deep blue | Blue | Blue | Deep blue | Blue |

As shown in Table 8b, the security feature obtained in comparative experiment C8 by using an ink containing no Vinnol® H14/36 show a a dark brown color with low chroma value in reflection. Such a color is not eye-catching for the layperson and cannot be used as security feature for securing a value document. The polyvinyl chloride copolymer Vinnol® H14/36 ensures that a gold color (i.e. a metallic yellow color) in reflected light is obtained. The amount of polyvinylchloride copolymer had a strong influence on the viscosity of the ink, which for a screen printing ink should preferably be between about 100 mPas and about 1000 mPas at 25° C., as in experiments E24-E27.

C8. Study the Influence of the Cationic Photoinitiators and of the UV-Vis Curing System on the Optical Properties of the Security Features (Experiments E28-E30 According to the Present Invention)

C8a. Preparation of the Inks I31-I33

TABLE 9a

Composition of the UV-Vis radiation curable screen printing inks I31-I33

| Ingredient | Commercial name | Amount wt-% | | |
|---|---|---|---|---|
| | | I31 | I32 | I33 |
| Polyvinylchloride copolymer | Vinnol ® H14/36 | | 7.3 | |
| Cycloaliphatic epoxide | Uvacure ® 1500 | 19.7 | 18.7 | 22.6 |
| Vinyl ether | CHVE | 16 | | |
| Radically curable oligomer | Ebecryl 2959 | 4.4 | | |

TABLE 9a-continued

Composition of the UV-Vis radiation curable screen printing inks I31-I33

| Ingredient | Commercial name | Amount wt-% | | |
|---|---|---|---|---|
| | | I31 | I32 | I33 |
| Radically curable monomer | TMPTA | | 9 | |
| Perfluoropolyether reactive surfactant | Fluorolink E10H | | 2.5 | |
| Cationic photoinitiator | Deuteron UV 1242 | 5.8 | 5.8 | |
| | 2,4,6- | | | 2.9 |
| | Triphenylpyrilium tetrafluoroborate | | | |
| Free radical photoinitiator | Omnirad 2100 | | 3.2 | |
| Photosensitizer | Speedcure CPTX | 0 | 1 | 0 |
| Antifoaming agent | Tego ® Airex 900 | | 0.8 | |
| Ag nanoplatelets | D1 | | 31.3 | |
| Cationically curable monomers | | 38.6 | 37.6 | 38.6 |
| Radically curable monomers and oligomers | | | 13.4 | |
| Solvent | | 18.8 | 18.8 | 18.8 |
| Ag nanoplatelets (solid content) | | | 12.5 | |

Ingredients provided in Table 9a were mixed and dispersed at room temperature using a Dispermat CV-3 for 10 minutes at 2000 rpm so as to yield 50 g of each Ink I31-I33.

C8b. Preparation of Security Features

The UV-Vis radiation curable screen printing Inks I31-I33 were independently applied on three pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. After the printing step, the three pieces of printed substrate were independently put on a heating plate (Huber PZ28-1) and heated during 10 seconds at 80° C., then cured by exposing them two times at a speed of 100 m/min to UV-Vis light under a dryer from IST Metz GmbH (two lamps: Iron-doped mercury lamp 200 W/cm²+mercury lamp 200 W/cm², to generate security features.

The UV-Vis radiation curable screen printing ink I32 was applied on a fourth piece of transparent polymer substrate (PET Hostaphan® RN, thickness 50 μm, supplied by Pütz GmbH+Co. Folien KG) using a 405 thread/cm screen (160 mesh). The printed pattern had a size of 5 cm×5 cm. After the printing step, the fourth piece of printed substrate was put on a heating plate (Huber PZ28-1) and heated during 10 seconds at 80° C., then cured under an UV-LED lamp Phoseon Type FireLine 125×20 mm, 395 nm, 8 W/cm²) during 2 seconds, to generate a security feature.

C8c. Results (Optical Properties) of Security Features

The optical properties of the security features obtained in the experiments E28. E29a, E29b and E30 according to the present invention were independently assessed in reflection, in transmission, and visually using the tests described at item C1c.

The colors in reflection and transmission and the chroma values C* (reflection 22.5/0° and transmission 8°) exhibited by the security features are displayed in Table 9b below.

TABLE 9b

Color properties of security features obtained in the experiments E28, E29a, E29b and E30 according to the present invention.

| | E28 | E29a | E29b | E30 |
|---|---|---|---|---|
| Curing system | Hg lamps | Hg lamps | UV-LED lamp | Hg lamps |
| Cationic photoinitiator | Diaryliodonium | Diaryliodonium + thioxanthone | Diaryliodonium + thioxanthone | Triphenyl-pyrilium |
| Ink | I31 | I32 | I32 | I33 |
| C* (reflection 22.5/0°) | 30 | 29 | 27 | 28 |
| C* (transmission 8°) | 46 | 42 | 45 | 43 |
| Color (reflection) | Gold | Gold | Gold | Gold |
| Color (transmission) | Deep blue | Deep blue | Deep blue | Deep blue |

As shown in Table 9b, the security features obtained in experiments E28, E29a and E30 according to the present invention using an ink containing a diaryliodonium photoinitiator (I31), a diaryliodonium photoinitiator and a thioxanthone photosensitizer (I32), or a triphenylpyrylium photoinitiator (I33) and cured under standard mercury lamps exhibit gold color in reflection and deep blue color in transmission with similar chroma values both in reflection and transmission. Curing by UV-LED lamp or standard mercury lamps does not have any influence on the optical properties exhibited by the security feature as evidenced by experiments E29a and E29b.

The invention claimed is:

1. A process for producing a security feature for securing a value document, wherein said security feature exhibits a blue color upon viewing in transmitted light and a metallic yellow color upon viewing in incident light, said process comprising the following steps:
   a) printing a UV-Vis radiation curable ink on a transparent or partially transparent region of a substrate of a value document to provide an ink layer;
   b) heating the ink layer obtained at step a) at a temperature of 55° C. to 100° C. for at least one second so that the ink layer exhibits a metallic yellow color upon viewing in incident light; and
   c) UV-Vis curing the ink layer obtained at step b) to form the security feature; wherein the UV-Vis radiation curable ink comprises:
   i) silver nanoplatelets having a mean diameter in a range of 50 to 150 nm with a standard deviation of less than 60%, a mean thickness in a range of 5 to 30 nm with a standard deviation of less than 50%, and a mean aspect ratio higher than 2.0, wherein the mean diameter is determined by transmission electron microscopy and the mean thickness is determined by transmission electron microscopy;
   ii) from 40 wt-% to 75 wt-% of either a cycloaliphatic epoxide, or a mixture of a cycloaliphatic epoxide and one or more UV-Vis radiation curable compounds other than the cycloaliphatic epoxide;

iii) one or more cationic photoinitiators;
iv) a polyvinyl chloride copolymer containing at least 69 wt-% of vinyl chloride;
v) a perfluoropolyether surfactant functionalized with one or more functional groups selected from the group consisting of: hydroxyl, acrylate, and methacrylate; and
vi) 0-25 wt-% of an organic solvent;
a weight percent of ii), and vi) being based on a total weight of the UV-Vis radiation curable ink.

2. The process according to claim 1, wherein the mean diameter of the silver nanoplatelets is in a range of 70 to 120 nm with the standard deviation being less than 50%, the mean thickness of the silver nanoplatelets is in a range of 8 to 25 nm with the standard deviation being less than 30%, and the mean aspect ratio of the silver nanoplatelets is higher than 2.5.

3. The process according to claim 1, wherein the silver nanoplatelets bear a surface stabilizing agent of formula (I) on their surface

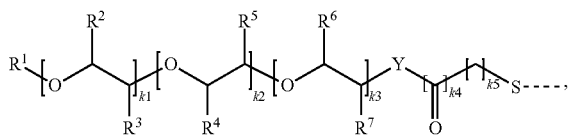

(I)

wherein
$R^1$ is H, $C_1$-$C_{18}$alkyl, phenyl, $C_1$-$C_8$alkylphenyl, or $CH_2COOH$;
$R^2$, $R^3$, $R^4$, $R^5$, $R^6$ and $R^7$ are independently of each other H, $C_1$-$C_8$alkyl, or phenyl;
Y is O, or $NR^8$;
$R^8$ is H, or $C_1$-$C_8$alkyl;
k1 is an integer in a range of from 1 to 500;
k2 and k3 are independently of each other 0, or integers in a range of from 1 to 250;
k4 is 0, or 1; and
k5 is an integer in a range of from 1 to 5.

4. The process according to claim 1, wherein the silver nanoplatelets bear a surface stabilizing agent which is a polymer, or copolymer, which is obtained by a process comprising the steps:
d1) polymerizing in a first step one or more ethylenically unsaturated monomers in presence of at least one nitroxylether having structural element

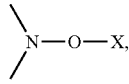

wherein X represents a group having at least one carbon atom and is such that free radical X● derived from X is capable of initiating polymerization; or
d2) polymerizing in a first step one or more ethylenically unsaturated monomers in presence of at least one stable free nitroxyl radical

and a free radical initiator;
wherein at least one monomer used in the steps d1) or d2) is a $C_1$-$C_6$ alkyl or hydroxy $C_1$-$C_6$ alkyl ester of acrylic or methacrylic acid.

5. The process according to claim 4, comprising the additional step e) comprising modification of the polymer or copolymer prepared under d1) or d2) by a transesterification reaction, an amidation, hydrolysis or anhydride modification or a combination thereof.

6. The process according to claim 1, wherein the UV-Vis radiation curable ink comprises one or more stabilizing agents selected from the group consisting of:
a compound of formula (IIb)
wherein

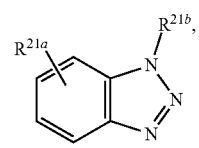

(IIb)

$R^{21a}$ is a hydrogen atom, a halogen atom, a $C_1$-$C_8$alkoxy group, or a $C_1$-$C_8$alkyl group;
$R^{21b}$ is a hydrogen atom, or a group of formula —$CHR^{24}$—$N(R^{22})(R^{23})$;
$R^{22}$ and $R^{23}$ are independently of each other a $C_1$-$C_8$alkyl, a hydroxy$C_1$-$C_8$alkyl group, or a group of formula —[($CH_2CH_2$)—O]$_{n1}$—$CH_2CH_2$—OH, wherein n1 is 1 to 5; and
$R^{24}$ is H, or $C_1$-$C_8$alkyl;
and
a compound of formula (IIc)
wherein

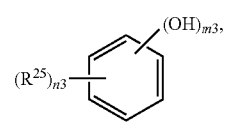

(IIc)

$R^{25}$ can be the same, or different in each occurrence and is a hydrogen atom, a halogen atom, a $C_1$-$C_{18}$alkyl group, a $C_1$-$C_{18}$alkoxy group, or a group —C(=O)—$R^{26}$,
$R^{26}$ is a hydrogen atom, a hydroxy group, a $C_1$-$C_{18}$alkyl group, unsubstituted or substituted aminogroup, unsubstituted or substituted phenyl group, or a $C_1$-$C_{18}$alkoxy group;
n3 is an integer comprised between 1 and 4; m3 is an integer comprised between 2 and 4, and sum of the integers m3 and n3 is 6.

7. The process according to claim 1, wherein the UV-Vis radiation curable ink comprises a concentration of silver nanoplatelets from 5 wt-% to 20 wt-%, wherein weight percents are based on a total weight of the UV-Vis radiation curable ink.

8. The process according to claim 7, wherein the concentration of silver nanoplatelets is from 7.5 wt-% to 17.5 wt-% or from 10 wt-% to 15 wt-%.

9. The process according to claim 1, wherein the one or more UV-Vis radiation curable compounds other than the cycloaliphatic epoxide comprise vii) one or more cationically curable monomers other than the cycloaliphatic epoxide, wherein the one or more cationically curable monomers are selected from the group consisting of: vinyl ethers, propenyl ethers, cyclic ethers, lactones, cyclic thioethers, vinyl thioethers, propenyl thioethers, hydroxyl-containing compounds, and mixtures thereof.

10. The process according to claim 1, wherein the one or more UV-Vis radiation curable compounds other than the cycloaliphatic epoxide comprise viii) one or more radically curable monomers and/or oligomers, and the UV-Vis radiation curable ink further comprises ix) one or more free radical photoinitiators.

11. The process according to claim 1, wherein the UV-Vis radiation curable ink comprises a concentration of polyvinyl chloride copolymer from 2.9 wt-% to 12 wt-%, wherein weight percents are based on a total weight of the UV-Vis radiation curable ink.

12. The process according to claim 11, wherein the concentration of polyvinyl chloride copolymer is from 4.9 wt-% to 11.6 wt-% or from 6 wt-% to 8.6 wt-%.

13. The process according to claim 1, wherein the polyvinyl chloride copolymer is selected from the group consisting of: vinyl chloride—vinyl acetate copolymer, and vinyl chloride—hydroxyacrylate copolymer.

14. The process according to claim 1, wherein the UV-Vis radiation curable ink comprises a concentration of perfluoropolyether surfactant from 0.05 wt-% to 5 wt-%, wherein weight percents are based on a total weight of the UV-Vis radiation curable ink.

15. The process according to claim 14, wherein the concentration of perfluoropolyether surfactant is from 0.075 wt-% to 5 wt-% or from 0.1 wt-% to 2.5 wt-%.

16. The process according to claim 1, wherein the UV-Vis radiation curable ink is solvent-free.

17. The process according to claim 1, wherein step c) comprises exposure of the ink layer obtained at step b) to UV-Vis light emitted by a UV-Vis light source selected from the group consisting of: mercury lamps, medium-pressure mercury lamps, UV-LED lamps, and sequences thereof.

18. The process according to claim 17, wherein the UV-Vis light source is selected from the group consisting of medium-pressure mercury lamps, UV-LED lamps, and sequences thereof.

19. The process according to claim 1, further comprising the steps f) and g) conducted after step c):
  f) applying on the substrate, a curable protective varnish to form a varnish layer; and
  g) curing the varnish layer obtained at step f) so as to form a protective coating.

20. The process according to claim 1, wherein the value document is selected from banknotes, deeds, tickets, checks, vouchers, fiscal stamps, agreements, and identity documents.

21. The process according to claim 1, wherein in a), the printing is performed by screen printing, rotogravure, or flexography.

22. The process according to claim 1, wherein the value document is selected from the group consisting of passports, identity cards, visas, driving licenses, bank cards, credit cards, transactions cards, access documents, entrance tickets, public transportation tickets, academic diplomas, and academic titles.

* * * * *